United States Patent
Sprague et al.

(10) Patent No.: US 7,515,329 B2
(45) Date of Patent: Apr. 7, 2009

(54) DRIVING A MEMS SCANNER WITH A COMBINED ACTUATOR DRIVE SIGNAL

(75) Inventors: Randall B. Sprague, Carnation, WA (US); Jun Yan, Cincinnati, OH (US); Jason B. Tauscher, Sammamish, WA (US); Wyatt O. Davis, Bothell, WA (US); John R. Lewis, Bellevue, WA (US); Dean R. Brown, Lynnwood, WA (US); Thomas W. Montague, Mercer Island, WA (US); Chancellor W. Brown, Everett, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 11/975,543

(22) Filed: Oct. 19, 2007

(65) Prior Publication Data

US 2008/0042052 A1 Feb. 21, 2008

Related U.S. Application Data

(62) Division of application No. 10/984,327, filed on Nov. 9, 2004, now Pat. No. 7,442,918.

(60) Provisional application No. 60/571,133, filed on May 14, 2004.

(51) Int. Cl.
*G02B 26/00* (2006.01)
(52) U.S. Cl. ........................................ 359/292; 359/295
(58) Field of Classification Search ................ 359/290, 359/291, 295, 223, 224
See application file for complete search history.

(56) References Cited

U.S. PATENT DOCUMENTS

| 4,530,138 A | 7/1985 | Ritter |
| 5,543,956 A | 8/1996 | Nakagawa et al. |

(Continued)

FOREIGN PATENT DOCUMENTS

| EP | 0 620 415 | 10/1994 |

(Continued)

OTHER PUBLICATIONS

Schenk H et al: "A resonantly excited 2D-micro-scanning-mirror with large deflection" Sensors and Actuators A, Elsevier Sequoia S.A., Lausanne, CH vol. 89, No. 1-2, Mar. 20, 2001.

(Continued)

*Primary Examiner*—Timothy J Thompson
(74) *Attorney, Agent, or Firm*—Kevin D. Wills

(57) ABSTRACT

A MEMS oscillator, such as a MEMS scanner, has an improved and simplified drive scheme and structure. Drive impulses may be transmitted to an oscillating mass via torque through the support arms. For multi-axis oscillators drive signals for two or more axes may be superimposed by a driver circuit and transmitted to the MEMS oscillator. The oscillator responds in each axis according to its resonance frequency in that axis. The oscillator may be driven resonantly in some or all axes. Improved load distribution results in reduced deformation. A simplified structure offers multi-axis oscillation using a single moving body. Another structure directly drives a plurality of moving bodies. Another structure eliminates actuators from one or more moving bodies, those bodies being driven by their support arms.

8 Claims, 18 Drawing Sheets

U.S. PATENT DOCUMENTS

| | | | |
|---|---|---|---|
| 5,594,232 | A | 1/1997 | Giordana |
| 5,715,337 | A * | 2/1998 | Spitzer et al. .................. 385/4 |
| 5,861,979 | A | 1/1999 | Ji et al. |
| 5,912,608 | A | 6/1999 | Asada |
| 5,969,465 | A | 10/1999 | Neukermans et al. |
| 5,982,528 | A | 11/1999 | Melville et al |
| 6,049,407 | A | 4/2000 | Melville et al |
| 6,107,115 | A | 8/2000 | Atobe et al. |
| 6,198,565 | B1 | 3/2001 | Iseki et al. |
| 6,243,186 | B1 | 6/2001 | Melville |
| 6,245,590 | B1 | 6/2001 | Wine et al. |
| 6,259,548 | B1 | 7/2001 | Tsugai et al. |
| 6,285,485 | B1 | 9/2001 | Ferriera |
| 6,360,035 | B1 | 3/2002 | Hurst, Jr. et al. |
| 6,392,220 | B1 | 5/2002 | Slater et al. |
| 6,449,079 | B1 | 9/2002 | Herrmann |
| 6,463,085 | B1 | 10/2002 | Tayebati |
| 6,466,358 | B2 * | 10/2002 | Tew .......................... 359/292 |
| 6,672,732 | B1 | 1/2004 | Niendorf et al. |
| 6,760,145 | B1 | 7/2004 | Taylor et al. |
| 6,769,616 | B2 | 8/2004 | Fu et al. |
| 6,912,078 | B2 | 6/2005 | Kudrle et al. |
| 6,963,679 | B1 | 11/2005 | Novotny et al. |
| 6,965,177 | B2 | 11/2005 | Turner et al. |
| 6,999,215 | B2 | 2/2006 | Dewa et al. |
| 7,050,211 | B2 | 5/2006 | Orcutt |
| 7,053,520 | B2 | 5/2006 | Zett et al. |
| 7,067,344 | B1 | 6/2006 | Oguchi |
| 2001/0048784 | A1 | 12/2001 | Behin et al. |
| 2002/0011759 | A1 | 1/2002 | Adams et al. |
| 2002/0044276 | A1 | 4/2002 | Stoner et al. |
| 2002/0050744 | A1 | 5/2002 | Bernstein et al. |
| 2002/0171901 | A1 | 11/2002 | Bernstein |
| 2003/0016428 | A1 | 1/2003 | Kato et al. |
| 2003/0053186 | A1 | 3/2003 | Arima |
| 2003/0209073 | A1 | 11/2003 | Carroll et al. |
| 2004/0007069 | A1 | 1/2004 | Turner et al. |
| 2004/0060898 | A1 | 4/2004 | Tsai |
| 2004/0105139 | A1 | 6/2004 | Hirose et al. |
| 2004/0218155 | A1 * | 11/2004 | Schenk et al. .................. 353/98 |
| 2005/0018322 | A1 | 1/2005 | Ben-Gad et al. |
| 2005/0045727 | A1 | 3/2005 | Fu |

FOREIGN PATENT DOCUMENTS

| | | |
|---|---|---|
| EP | 0692729 | 1/1996 |
| EP | 1 197 779 | 4/2002 |
| EP | 1275997 | 1/2003 |
| EP | 1338912 | 8/2003 |
| JP | 09197334 | 7/1997 |
| JP | 2000-214407 | 8/2000 |
| JP | 2004-069731 | 3/2004 |
| WO | WO 01/46741 | 6/2001 |
| WO | WO03/062899 | 7/2003 |

OTHER PUBLICATIONS

Nobuakai, Asai et al., "A Novel High Resolution Optical Scanner Actuated by Aerosol Deposited PZT Films", *IEEE pp. 247-250, Nagoya, Japan, 2003* 2003, 247-250.

PCT International Search Report—PCT/US2005/004065, Aug. 25, 2005.

\* cited by examiner

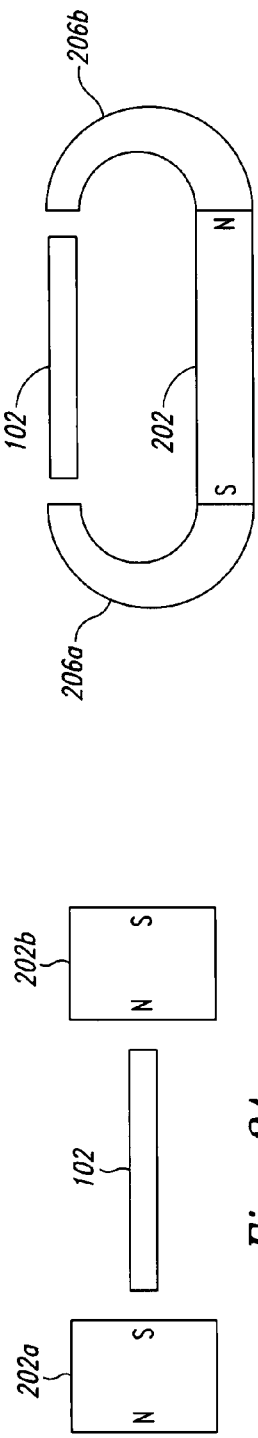
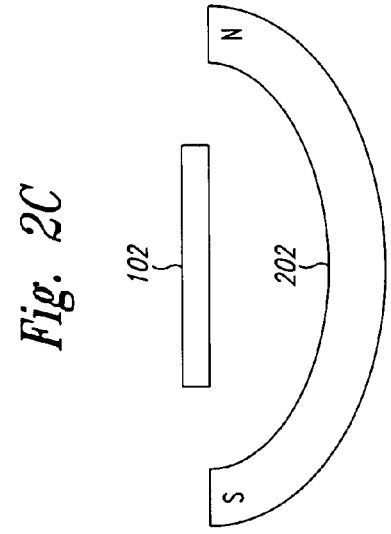
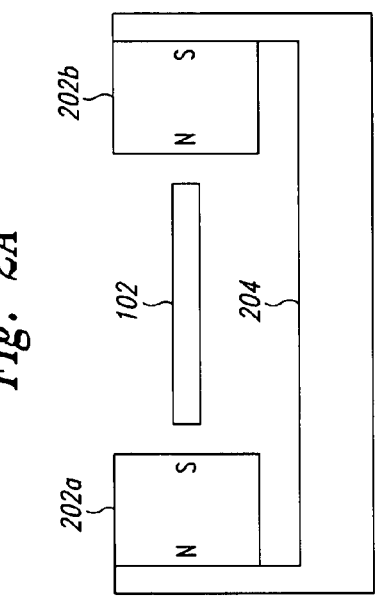
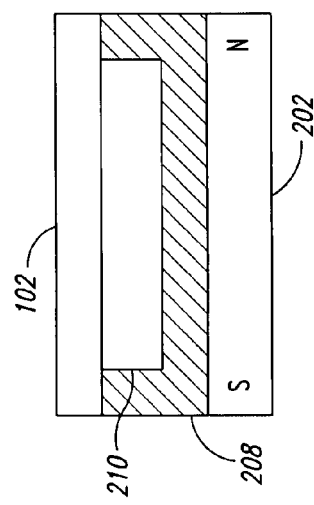

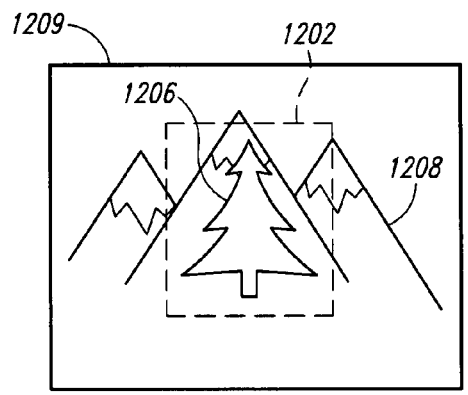
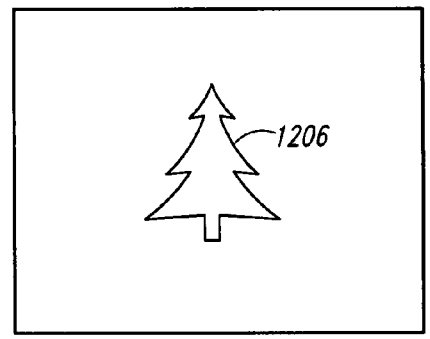
*Fig. 12A*   *Fig. 12B*
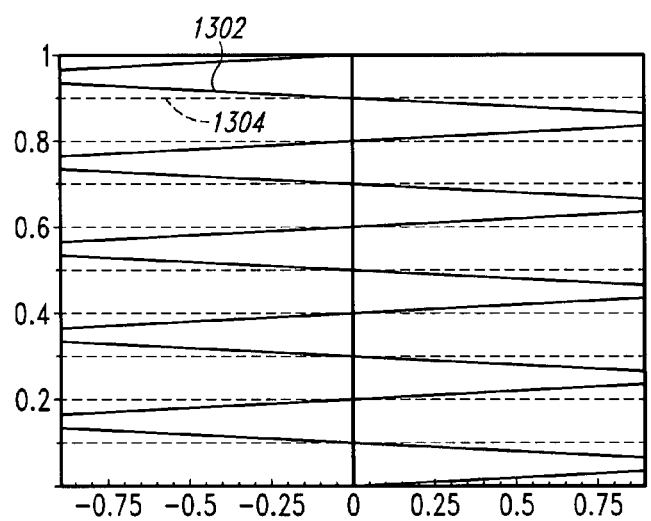
*Fig. 13*

$$m_1 \ddot{x}_1 + c_1 \dot{x}_1 + (k_1 + k_{12})x_1 = k_{12}x_2 + F_1$$

$$m_2 \ddot{x}_2 + c_2 \dot{x}_2 + k_{12}x_2 = k_{12}x_2 + F_1$$

DRIVING A MEMS SCANNER WITH A COMBINED ACTUATOR DRIVE SIGNAL

CROSS REFERENCE TO RELATED APPLICATIONS

This application is a Division of U.S. patent application Ser. No. 10/984,327, filed on Nov. 9, 2004 now U.S. Pat. No. 7,442,918; which claimed priority under 35 U.S.C. 119(e) to U.S. Provisional Application Ser. No. 60/571,133, filed May 14, 2004.

FIELD OF THE INVENTION

The present invention relates to MEMS devices and scanners and scanned beam systems that use MEMS scanners, and more particularly to MEMS oscillators having actuators with multiplexed drive signals.

BACKGROUND OF THE INVENTION

MEMS (Micro electro mechanical system) devices may be used in many applications including rear and front projection scanned beam displays, scanned beam image capture devices, optical gyroscopes, accelerometers, and other applications. In addition to displays that project an image onto a conventional opaque or translucent viewing screen, scanned beam displays can include retinal scanning displays (RSDs) and heads-up displays (HUDs). Scanned beam image capture applications include one-dimensional (1D) or linear scanning devices such as linear bar code scanners and two-dimensional (2D) image capture devices such as 2D bar code or omnidirectional linear bar code imagers, 2D bar code scanners, confocal microscopes, microprobes, medical imaging systems, and others.

For cases where the MEMS device is used to scan a beam of light, it is frequently called a MEMS scanner or beam deflector. MEMS scanners may operate resonantly or non-resonantly, and may scan in one or a plurality of axes.

MEMS devices may carry light emitters directly or alternatively may deflect a beam through a scan angle. In beam deflection applications, one or more scan plates have a reflective surface that is used to scan an impinging beam over a field of view. The reflective surface may include a plated reflective metal such as gold or aluminum, a dielectric stack, bare silicon, or other materials depending upon wavelength and other application issues.

2D scanning may be achieved by arranging a pair of 1D scanners with their axes of rotation at substantially right angles to one another. Alternatively, 2D scanners may use a single mirror that is driven to rotate around both scanning axes. When a single mirror is used to scan in two axes, a gimbal ring may be used to allow appropriate rotation. Frequently, 2D scanners include an inner scan plate carrying a mirror that performs a fast scan with an outer gimbal ring performing a slow scan. Conventionally, the fast scan sweeps back and forth horizontally across the field of view (FOV) while the slow scan indexes down the FOV by one or two lines. Such systems may be termed progressive scan systems. In such systems the fast scan operates at a relatively high scan rate while the slow scan operates at a scan rate equal to the video frame rate. In some applications, the fast scan operates resonantly while the slow scan provides a substantially sawtooth pattern, scanning progressively down the frame for a (large) portion of the frame time and then flying back to the top of the frame to start over. In other applications, interleaved sawtooth scanning, triangular wave scanning, sinusoidal scanning and other waveforms are used to drive one or both axes.

Although this document frequently refers to a fast scan direction as horizontal (rotating about a vertical scan axis) and a slow scan direction as vertical (rotating about a horizontal scan axis), it must be realized that such a convention is not limiting. The teaching applies similarly to systems with fast and slow scans in the vertical and horizontal directions, respectively, as well as other directions.

In progressive scan systems, the beam may be scanned unidirectionally or bidirectionally depending upon the desired resolution, frame rate, and scanner capabilities. Bi-directionally scanned systems may suffer from raster pinch as described by Gerhard et al in U.S. Pat. No. 6,140,979 entitled Scanned Display with Pinch, Timing, and Distortion Correction. One approach to compensating for raster pinch is to add a correction mirror that corrects the beam path to more nearly approximate an ideal raster pattern.

More recently, work by the applicant has focused on alternative scan patterns that scan the beam in a Lissajous scan pattern over the FOV. Lissajous scan patterns have an advantage in being able to operate the MEMS scanner resonantly in both axes, thus reducing power consumption. Such systems may also have reduced torque requirements and may thus be made smaller and have other advantages.

Various actuation technologies for MEMS scanners have been disclosed. Electrocapacitive drive scanners include both rear drive pad and comb drive architectures. Magnetic drive scanners include moving coil and moving magnet types. Other technologies include thermal, piezoelectric, and impact motor drives. Rotation may be constrained by torsion arms, bending flexures and other arrangements. Electrocapacitive drive systems are sometimes referred to as electrostatic in the literature. Bending flexures are popularly referred to as cantilever arms.

Frequently, two or more drive schemes are combined to provide independent drive in two or more axes. For example, the Gerhard et al patent listed above shows a MEMS scanner with a fast scan axis that is powered electrocapacitively and a slow scan axis that is powered magnetically. The need to provide independent drive actuators for each axis has heretofore limited size reductions as well as the number of axes.

Another aspect of MEMS oscillator requirements frequently includes the need to monitor device motion or angle. Various schemas have been proposed and used including piezo-resistive and optical feedback.

Overview

According to Aspects of the Present Invention, a Superior Actuator Design may be applied to MEMS devices. Additionally, according to other aspects, structures, functionality, performance and cost may be improved.

According to one embodiment, a plurality of actuator mechanisms may be coupled in series or in parallel. Each actuator mechanism may be paired with an oscillator component having a characteristic resonance frequency and amplification factor. A single composite signal containing drive signals for each of the actuator mechanisms may be used to actuate the actuators. The actuator responds to one or more specific drive signal components based on the resonance frequency and amplification factor characteristics of its paired oscillator component.

According to some embodiments, the plurality of actuator mechanisms may be electrically coupled through wires. In other embodiments, the plurality of actuator mechanisms may be coupled wirelessly through, for example, an electromagnetic or acoustic interface. Electromagnetic interfaces may include RF, microwave, infrared light, visible light, ultraviolet light, or other forms of radiation.

According to other embodiments, various stationary magnet designs may be used to improve coupling of a moving coil scan plate to the magnetic field. The stationary magnets may be permanent magnets or electromagnets.

According to another embodiment, a single axis magnetic field may be used to drive scanning in two or more non-parallel axes. The magnetic field may be oriented to be transverse to each of the axes. The angle of the magnetic field may be optimized according to the system requirements. Response variables include minimization of peak current, minimization of power consumption, maximization of torque in one or more of the axes, minimization of size of one or more of the drive coils, minimization of response time to a signal input, matching of oscillation amplitudes, selection of phase relationships between frequency components of the drive signal, and matching of resonant and non-resonant drive schemas.

According to another embodiment, 2D scanning may be realized using a structure having one or more flexures that allow rotation in two or more axes to eliminate the gimbal ring.

According to another embodiment, a sensing coil may be used to determine component position and movement. The sensing coil may be formed using no additional mask layers by forming crossovers and crossunders in the coil layers. The sensing coil is made continuous by using a crossunder in the actuator coil conductor layer. The actuator coil is made continuous by using a crossover in the sensing coil conductor layer. A dielectric layer separates the conductor layers.

According to another embodiment, portions of the MEMS scanner are mechanically coupled to be driven in sympathetic resonance. In this document, the term sympathetic resonance is to be understood to refer to the phenomenon whereby slight movement by one element of a MEMS system is mechanically communicated to a second element of the system, the second element being thus driven to relatively greater amplitude movement by virtue of its resonant behavior. Such movement may be driven on-resonance or off-resonance, as will be explained herein. Vibrations in one portion of the scanner get transmitted and amplified by the resonance and amplification factor of a second portion of the scanner. The motion of first portion of the scanner receives negligible input from the portion of the signal intended for the second portion of the scanner. The second portion of the scanner may be driven to substantial amplitude in sympathetic oscillation.

According to another embodiment, attaching the surface to flexures through a suspension may minimize deformation of an active surface. In some embodiments, MEMS scan plates or portions thereof are driven to rotate through torsion arms. The torsion arms undergo significant strain. Spreading the torsional load over a torque distribution member termed a suspension reduces strain in the active surface. The active surface may comprise a mirror, one or more emitters, or other features that benefit from maintaining a predetermined shape.

According to another embodiment, a MEMS scanner may be driven entirely sympathetically with little motion of the actuator in the axis of oscillation of the actuator. One or more actuators may be affixed to stationary surfaces. Periodic impulses of the actuator are mechanically transmitted across the MEMS structure. Portions of the MEMS device are thus driven to oscillate to a desired amplitude via mechanical coupling through the device.

The terms oscillator and scan plate are used herein somewhat interchangeably. Either term generally refers to a structure of a MEMS device that may be driven through a periodic motion. A scan plate may be driven with a sinusoidal periodicity that may be referred to as oscillation. In addition, structures such as gimbal rings that impart freedom of motion in a plurality of axes, combined with the additional structures suspended therefrom, may be thought of as oscillating assemblies. In other embodiments according to the invention, structures such as gimbal rings and scan plates may be driven in motions that are not simply sinusoidal, but rather contain higher order sinusoidal components that cooperate to confer motion approximating a sawtooth, square, triangular, or other waveform.

According to another embodiment, drive signals for various dimensions of movement by a MEMS device may be combined into a single composite drive signal having a plurality of frequency components. The composite drive signal is transmitted to the MEMS device via a single pair of drive leads. The MEMS device is designed such that each dimension of movement responds to one or more intended frequency components according to its resonant frequency and amplification factor, while minimizing response to other frequency components.

According to another embodiment, two or more sinusoidal signals may be combined in a drive circuit and transmitted to a MEMS device as a single drive signal.

According to another embodiment, one or more resonant signals may be combined with a non-resonant signal such as an approximately sawtooth waveform, for example. For such an embodiment, a non-resonant member may be directly driven while one or more resonant drive signals are propagated through the structure. To prevent the non-resonant signal from exciting the resonant body, frequency components near the resonant frequency of the resonant body are eliminated from the non-resonant signal. This may be conveniently accomplished, for example, by including only lower order harmonics in the non-resonant signal.

According to another embodiment, a MEMS drive signal generator includes provision for generating and combining a plurality of frequency components.

According to another embodiment, a moving magnet MEMS actuator includes a magnet mounted on suspension elements. The suspension elements spread the torque load across the active surface of the device and thus limit distortion.

According to another embodiment, a moving magnet MEMS actuator may include a moving system having anti-parallel magnetic fields. A single electromagnet may induce rotation about one or more axes by simultaneously attracting one field while repelling the other.

According to another embodiment, an improved MEMS scanner may be used in a scanned beam imager.

According to another embodiment, an improved MEMS scanner may be used in a scanned beam display.

According to another embodiment, an improved MEMS scanner may be used to produce a corrected scan path. The scanner may include three or more degrees of freedom, each of which responds to a drive signal according to its resonant frequency and amplification factor. Thus, it is practical to drive three or more scan axes (some of which may be substantially parallel) without the complication of providing three sets of drive leads and three actuators. The drive signals are propagated through the scanner using the off-resonance response of intermediate structures.

Other aspects of the invention will become apparent according to the appended drawings and description, to be limited only according to the claims.

BRIEF DESCRIPTION OF THE DRAWINGS

FIG. 2A is a sectional view of the MEMS scanner of FIG. 1 showing magnets for generating a magnetic field.

FIG. 2B is a sectional view of the MEMS scanner of FIG. 1 showing another embodiment of magnets.

FIG. 2C is a sectional view of the MEMS scanner of FIG. 1 showing another embodiment of magnets.

FIG. 2D is a sectional view of the MEMS scanner of FIG. 1 showing another embodiment of magnets.

FIG. 2E is a sectional view of the MEMS scanner of FIG. 1 showing another embodiment of magnets.

FIG. 12A is a diagram of information presented to the user of the scanned beam display of FIG. 11 when used in a see-through mode.

FIG. 12B is a diagram of information presented to the user of the scanned beam display of FIG. 11 when used in an occluded mode.

FIG. 13 is a beam position diagram showing the path followed by the scanned beam in response to a ramped vertical scan exemplified by individual waveforms 602 and 608 and combined waveform 610 of FIG. 6.

DETAILED DESCRIPTION OF THE INVENTION

Figure 1:
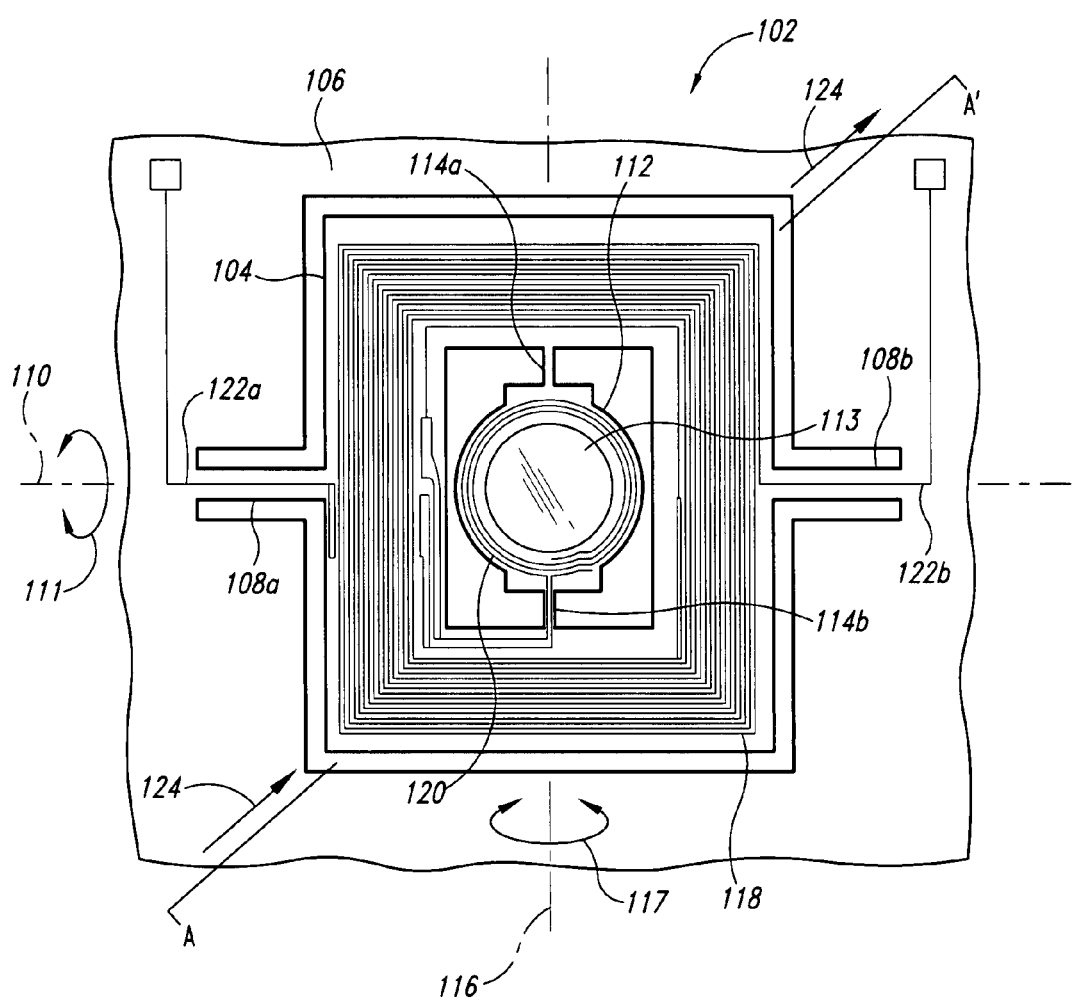
FIG. 1 is a top view of a magnetic drive MEMS scanner having two scanning axes driven by moving coils wired in series.

FIG. 1 illustrates an embodiment according to the invention having a series actuator that carries drive signals for a plurality of axes. Mechanical motion for the various axes is determined by the matching of drive signal frequency components to the mechanical resonance of each axis.

MEMS scanner 102, here embodied as a beam scanner or beam director, comprises various structures etched or formed in a silicon die. Outer support structure 104 acts as a frame to anchor the scanner to other mounting features (not shown) and includes pads (not shown) for receiving drive signals and traces for transmitting the drive signals to the actuator(s). Support structure 104 may further include traces and pads for providing drive current to sensors and transmitting position-sensing signals to a controller.

Outer support frame 104 supports gimbal 106 on torsion arms 108a and 108b. As is conventional, the terms "gimbal" and "gimbal ring" are used interchangeably herein. It should be understood that a variety of specific structures may act as a gimbal including open and closed-end rings, and other non-ring type structures that allow controlled movement about selected axes.

Torsion arms 108a and 108b allow gimbal ring 106 to rotate about axis 110 as indicated by arrow 111. Suspended within gimbal 106 is oscillator or scan plate 112, which may for example take the form of a plate that has a mirror 113 formed thereon. In the description herein, the terms "oscillator" and "scan plate" may be used interchangeably for many purposes. Torsion arms 114a and 114b couple scan plate 112 to gimbal ring 106, and allow the scan plate to rotate about axis 116 as indicated by arrow 117. As is apparent, axis 116 is fixed relative to the gimbal ring 106 and rotates along with the gimbal ring relative to support frame 104

As an alternative or in addition to mirror 113, scan plate 112 may have one or more electromagnetic energy sources formed thereon, the movement produced by scan plate 112 thus directly scanning one or more beams of electromagnetic energy. Such electromagnetic energy sources may emit any or several of a broad range of wavelengths including gamma, x-ray, ultraviolet, visible, infrared, microwave, or radio. For ultraviolet, visible, and infrared emissions, the electromagnetic energy source (now termed a light source) may include one or more laser diode light sources, such as conventional edge-emitting or vertical cavity emitting lasers for example, one or more LEDs, one or more fluorescent sources, or other types of emitters.

The mass and distribution of mass within scan plate 112 and the stiffness of torsion arms 114a and 114b determine a resonant frequency and amplification factor for the rotation of scan plate 112 about axis 116. Similarly, the combined mass of the assembly comprising gimbal ring 106, torsion arms 114a and 114b, and scan plate 112 (and their mass distribution); and the stiffness of torsion arms 108a and 108b determine a resonant frequency and mechanical amplification factor (also called simply "amplification factor") for the rotation of the scan plate and gimbal assembly about axis 110. In general, the designer has wide latitude in choosing a resonant frequency and amplification factor for each of the two axes. For a two-axis (and by analogy, multi-axis) MEMS scanner 102, the resonant frequency of scan plate 112 rotation about axis 116 may be selected to be significantly higher than the resonant frequency for the assembly's rotation about axis 110.

Actuator 118, embodied as a coil in the example of FIG. 1, may be driven to produce rotation of gimbal ring 106 and suspended scan plate 112 about axis 110. Similarly, actuator 120, also embodied as a coil, may be driven to produce rotation of scan plate 112 about axis 116. Coils 118 and 120 will act as actuators when MEMS scanner 102 is held in a magnetic field, such as that indicated as 124, that is transverse to both axes 110 and 116. When coil 120 receives a signal that is periodically driven at a rate corresponding to the resonance frequency (or any frequency that produces a suitable response) of scan plate 112, the amplitude of the rotation of scan plate 112 will be increased proportionally to its amplification factor. In a similar manner, when coil 118 receives a signal that is periodically driven at a rate corresponding to the resonance frequency of the assembly comprising scan plate 112, torsion arms 114a and 114b, and gimbal ring 106; the assembly will oscillate about axis 110 with enhanced amplitude owing to the mechanical amplification factor. By analogy, each resonance frequency acts as a receiver tuned to receive a respective signal.

In alternative embodiments it may be preferable to provide a drive signal corresponding to one or more harmonics of a MEMS member. Additionally, more complex waveforms may be used to achieve a desired velocity profile as the MEMS member sweeps through its range.

In the MEMS scanner 102 of FIG. 1, coils 118 and 120 are wired in series. Alternatively, coils 118 and 120 could be wired in parallel. In either event, according to one embodiment, each coil responds to drive its respective element according to the resonance characteristics of its associated member. Thus a single signal to drive both axes is fed to the coils via leads 122a and 122b. When the single signal contains frequency components equal to each of the resonant frequencies of the system, each of the gimbal 106 and scan plate 112 will respond preferentially to their individual characteristic resonant frequencies. In some systems, the actuators may respond with a characteristic 6 dB per octave roll-off or higher. Thus, with sufficient resonant frequency separation between the axes, each axis of rotation will substantially be driven only at its resonant frequency.

In still other embodiments according to the invention, a scan plate, gimbal ring, etc. may be driven off-resonance. As will be explained in more detail with respect to FIGS. 16-20, a suitable amount of movement in a member may be induced over a broad range of frequencies. Thus, the term resonance, as used herein, is a shorthand way of referring to a resonant response that occurs over a range of frequencies, typically peaking at a single resonance frequency.

The actuators of FIG. 1 operate to generate a variable magnetic field. They are suspended in a magnetic field that is transverse to each of the rotation axes 110 and 116. The example of FIG. 1 shows the transverse B field substantially in the nominal plane of the device. A magnetic B field, whose axis is indicated by arrows 124, may be generated using various arrangements of electromagnets or permanent magnets. FIGS. 2A through 2E illustrate some of the possible arrangements of magnets, each illustrated as a sectional view taken along section A-A' of FIG. 1. The orientation of the B field, as indicated by the direction of arrows 124, may be varied to achieve desirable operating characteristics, such as setting the desired response to various drive signals, or to suppress undesirable characteristics such as minimizing response in an undesirable axis or mode.

In FIG. 2A, magnets 202a and 202b are oriented with opposing magnetic poles facing one another across MEMS die 102. In FIG. 2B, the far poles of magnets 202a and 202b are joined by a keeper 204. The keeper 204 is optimally constructed of a high magnetic permeability, high saturation material such as steel, for example. A high permeability, high saturation keeper can help to concentrate the magnetic field between the facing poles of magnets 202a and 202b by reducing the fringing field around each magnet to its opposite face. In FIG. 2C, the magnetic field is generated by a single magnet 202. The magnetic field is concentrated across MEMS die 102 by opposing pole pieces 206a and 206b. Pole pieces 206a and 206b are again optimally formed of a high magnetic permeability, high saturation material such as steel. FIG. 2D illustrates use of a single magnet 202 that directs a fringing field across MEMS die 102. FIG. 2E illustrates a single magnet formed on the back of a MEMS assembly. MEMS die 102 is joined to a spacer 208, forming a cavity 210 that allows for rotation of rotating parts out of plane. Magnet 202 is formed on the back of spacer 208. Spacer 208 may be formed of several materials including ferromagnetic materials such as steel and non-ferromagnetic materials such as silicon or glass.

Figure 3A:
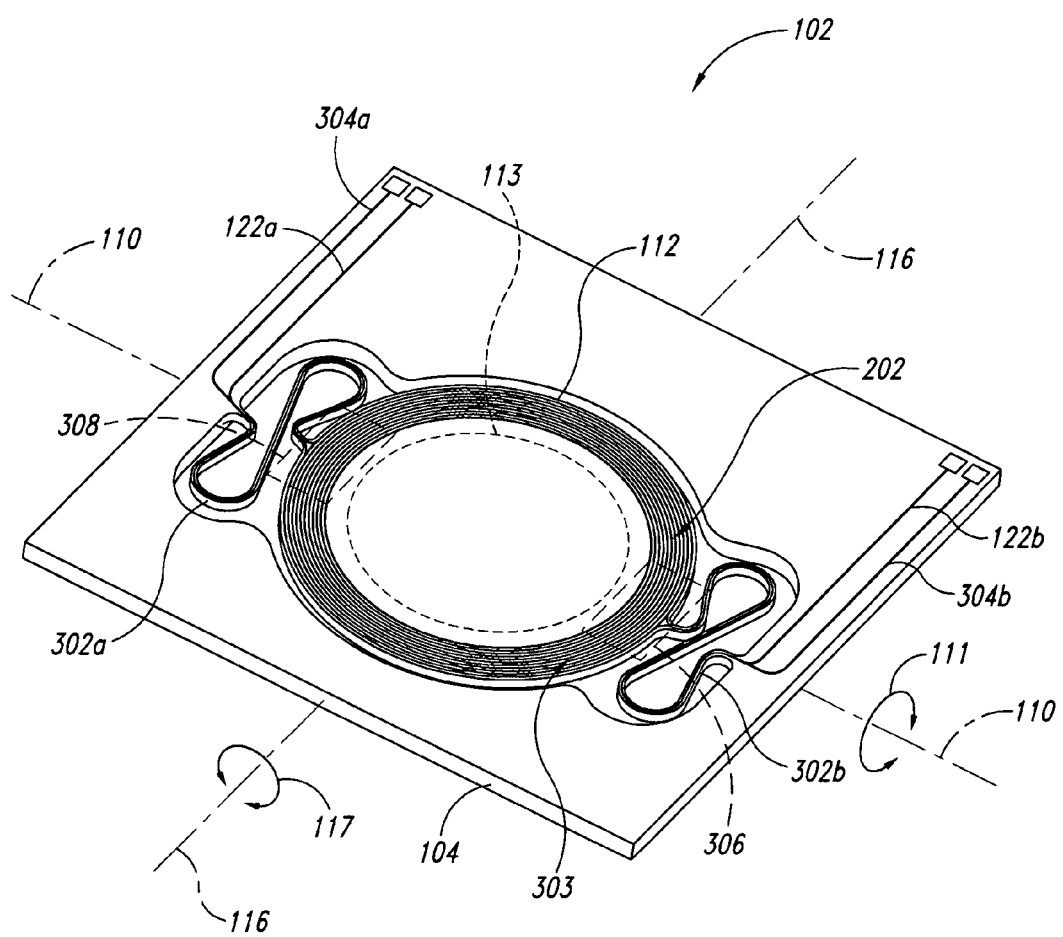
FIG. 3A is a view of a magnetic drive MEMS scanner having two scanning axes driven by a single moving coil and having a single pair of biaxially compliant support arms.

FIG. 3A illustrates an alternative embodiment of a MEMS scanner 102 having two rotation axes 110 and 116. In the MEMS scanner of FIG. 3, a single pair of biaxially compliant support arms 302a and 302b support scan plate 112 and replace the separate pairs of torsion arms 108a,b and 114a,b. The need for a separate gimbal ring 106 is thus eliminated.

The resonant frequency and amplification factor of scan plate 112 may be selected independently in each of the axes 110 and 116 by distributing its mass differently about each of the axes and by designing the support arms 302a and 302b to have different torsional stiffness in each axis. For the example of FIG. 3, scan plate 112 may have a relatively high resonant frequency for rotation about axis 116 and a somewhat lower resonant frequency for rotation about axis 110.

Mirror 113 is shown as a dotted line because for the particular embodiment of FIG. 3A, bare silicon is used as the reflective surface. Thus there is no mirror edge per se, but rather a mirror region that is defined by the extent of a beam impinging upon the silicon surface. This defined edge may vary depending upon particular beam alignment, shape, and size and depending upon the instantaneous angle of mirror 112 relative to the beam. The effective mirror surface becomes more circular for those instances when the mirror rotates toward the beam forming a more normal angle, and becomes more elliptical when the mirror rotates away from the beam.

Scan plate 112 includes a single drive coil 202 positioned peripherally around a mirror 113. The drive coil 202 is energized by leads 122a and 122b. Although leads 122a and 122b are shown carried on different support arms, they may alternatively be carried on a single arm. Leads 122a and 122b may be connected to a drive signal having a plurality of frequency components. Drive coil 202 then receives each of the frequency components. When drive coil 202 receives a frequency component equal to the resonant frequency of axis 110, it drives scan plate 112 to rotate about axis 110 at its resonant frequency. Similarly, when drive coil 202 receives a frequency component equal to the resonant frequency of axis 116, it drives scan plate 112 to oscillate about axis 116 at its resonant frequency. Thus scan plate 112 may be driven substantially independently to rotate about two axes at different frequencies.

For the particular embodiment of FIG. 3a, the resonant (horizontal) scan frequency around axis 116 is 2.6 KHz. The resonant (vertical) scan frequency around axis 110 is 0.8 kHz. The respective horizontal and vertical scan angles are 9.4° and 0.85°. There may be a small amount of crosstalk between the vertical and horizontal scan. For example, for respective amplification factors of 500 to 1500, the vertical drive may couple into the horizontal drive, resulting in a horizontal pixel offset of approximately 3 pixels top-to-bottom. Varying the pixel clock or remapping the image may accommodate this where desired. Similarly, the horizontal drive may couple into the vertical drive resulting into a vertical pixel offset of approximately 0.7 pixel. This may be accommodated by maintaining flexure symmetry, producing an asymmetry to counteract the offset, or by image remapping. As noted below, introducing a correction mirror may further compensate vertical motion. The correction mirror may be designed to accommodate horizontal-to-vertical drive coupling as well as raster pinch.

Figure 3B:
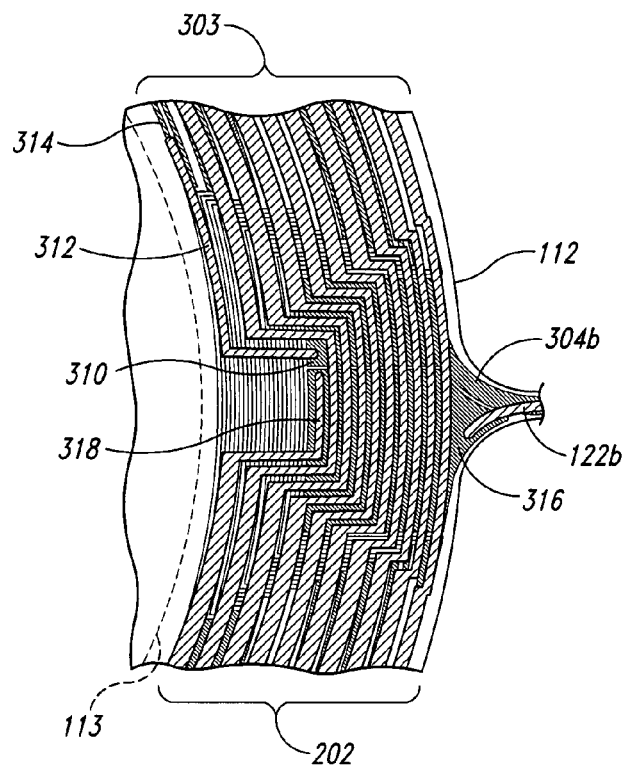
FIG. 3B is a detailed view of the drive coil and sense coil pass over and passunder of FIG. 3A.
Figure 3C:
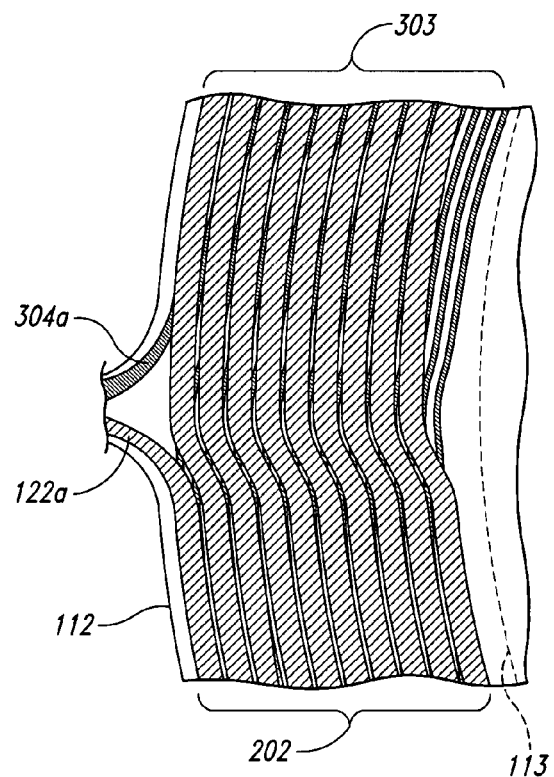
FIG. 3C is a detailed view of the outer drive coil and sense coil leads of FIG. 3A.

The MEMS scanner of FIG. 3A further includes a sense coil 303 upon which drive coil 202 is partially superimposed. The sense coil is connected to leads 304a and 304b. The sense coil is formed over or beneath drive coil 202, as shown in FIGS. 3B and 3C, from a first metal layer separated from the second metal layer of the drive coil by a dielectric layer. The first metal layer additionally forms a pass-under for the second metal layer and the second metal layer forms a pass-over for the first metal layer. The sense coil undergoes induced current flow caused by its movement through the magnetic field. The current or voltage may be sensed and the velocity or position of the scan plate and mirror determined therefrom.

Referring to detail sections 306 and 308 for the particular embodiment shown in FIGS. 3B and 3C, respectively, metal layer 1, indicated by the darker traces, is comprised of deposited metal consisting of 1000 angstrom TiW, 2400 ang Gold, 200 Ang TiW on 300 micron thick silicon, shown as the light gray region. The scan plate and support arm silicon is selectively backside etched to 80 micron thickness by timed deep reactive ion etching to reduce weight while forming reinforcing ribs to maintain stiffness. A dielectric layer (not shown) is formed over metal layer 1. Metal 1 to Metal 2 connections are formed by leaving holes in the dielectric layer at appropriate locations. Metal layer 2, indicated by the lighter traces, is comprised of 10 micron thick gold. Metal layer 2 is plated over the dielectric layer.

The sense coil 303, which lies under drive coil 202 for much of its path, is formed in metal 1 (gold) and comprises 21-½ turns. The sense coil trace is approximately 12.5 microns wide with 10 micron spacing, yielding a coil resistance of 1.5 kilo-ohms. Sense coil enters scan plate 112 through trace 304b, which terminates in a passunder 310 as shown in FIG. 3B. Metal 2 jumper 312 connects passunder 310 to the inner end 314 of sense coil 303. Sense coil spirals out in a counter-clockwise direction and exits scan plate 112 at trace 304a as shown in FIG. 3C. The choice of a counter-clockwise-out spiral is arbitrary and could be substituted by a clockwise-out spiral, resulting in a 180° difference in sensed phase.

The drive coil 202, which lies over sense coil 303 for much of its path, is formed in metal 2 and comprises 9-½ turns. The drive coil trace is approximately 28 microns wide with 10 micron spacing, yielding a coil resistance of 12 Ohms. The drive coil enters scan plate 112 through trace 122b as shown in FIG. 3A. Trace 122b connects to metal 1 passunder 316, which connects to the inner end 318 of drive coil 202. The drive coil spirals out in a clockwise direction and exits scan plate 112 at trace 122a as shown in FIG. 3C. As with the sense coil, the choice of a clockwise-out spiral is arbitrary.

In one particular embodiment, scan plate 112 is suspended in a magnetic field oriented 30° to the right of axis 116 with a field strength of 0.21 Tesla. Under these conditions, the sense coil produces a horizontal sense electro-motive force (EMF) of 80 mV peak and a vertical sense EMF of 2 mV peak when the scan plate is driven at its designed angles and frequencies. Other magnetic field angles may be used in some cases, depending upon the desired vector components of the magnetic field according to the application.

While the sense coil of the MEMS scanner of FIGS. 3A, 3B, and 3C could be used to sense motion in both axes, it may be desirable for some applications to add piezo-resistive, photodetector, or other sensors to sense motion.

Figure 4A:
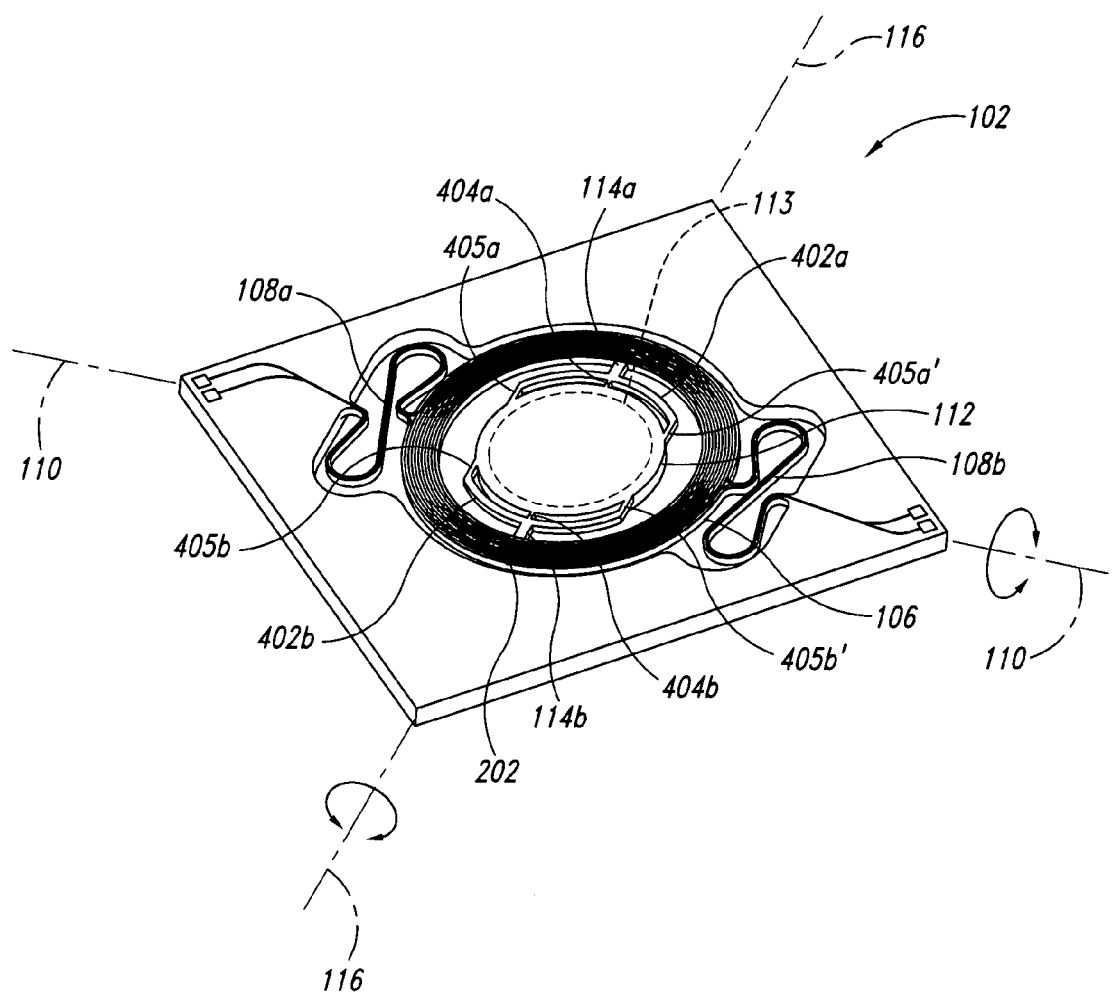
FIG. 4A is a view of a magnetic drive MEMS scanner having two scanning axes driven by a single moving coil on the gimbal ring.

While FIG. 1 illustrates the case of a pair of series-wired drive coils formed on both an inner scan plate and a gimbal ring and FIG. 3A illustrates a single drive coil on an inner scan plate, FIG. 4A illustrates the case of a single drive coil 202 on a gimbal ring 106 with an inner scan plate 112 being induced to "ring" through mechanical coupling across its torsion arms 114a and 114b. Drive coil 202 rotates the assembly comprising gimbal ring 106 and inner scan plate 112 about axis 110 directly. In this form, the drive signal for the resultant slow scan may be either resonant or may have another arbitrary shape. In some embodiments, the slow scan may be of a modified sawtooth form with progressive movement around the axis alternating with a rapid fly-back to the starting position. When the drive signal also includes a component modulated at the resonant frequency of the inner scan plate 112, the very slight mechanical response of the gimbal 106 gets transmitted across torsion arms 114a and 114b, through suspension elements 402a and 402b, to scan plate 112. Owing to the resonant response of the inner scan plate, the transmitted movement amplified by the system and result in resonant rotation of the inner scan plate about fast scan axis 116. When a mirror 113 is formed on inner scan plate 112, the resultant rotational movements may be used to direct a beam of light across a two-dimensional field of view.

Axes 110 and 116 may be placed at arbitrary angles to one another. While the example of FIG. 4A (and other examples below) are shown having "nested" scanning masses oriented at 90° to one another, other angles between 0° and 90° may be used. The inventors have discovered that drive impulses at the resonant is frequency of inner scan plate 112 couple quite efficiently at various angles.

While gimbal support arms 108a and 108b are indicated as having a serpentine shape, straight, split, multiple and many other shapes of torsion arms may alternatively be used. The scanner of FIG. 4A may include piezo-resistive sensors in some or all of its torsion arms to measure position.

The inner scan plate 112 of FIG. 4A is illustrated supported by a suspension. The suspension transmits rotational torque between torsion arms 114a and 114b and suspended structure 112 while imposing a controlled dynamic deformation on the suspended structure. In some applications, and particularly some applications where the inner scan plate forms a base for a mirror 113, it is useful to impose a minimal amount of dynamic deformation on inner scan plate 112, thus keeping the mirror as flat as possible for minimum optical distortion.

In the particular embodiments represented by FIG. 4A, the suspension 402 includes a pair of suspension elements 402a and 402b, each connected to inner scan plate 112 at three locations. As indicated in the Figure, suspension element 402a includes an axial connection 404a and two lateral connections, 405a and 405a', through which torque is communicated with the inner scan plate 112. Similarly, suspension element 402b includes an axial connection 404b and two lateral connections, 405b and 405b', through which torque is communicated with the inner scan plate 113. In the case of one particular embodiment of FIG. 4A, axial connections 404a and 404b are respectively smaller in cross section than torsion arms 114a and 114b. This limits the amount of torque concentration at the point where axial connections 404a and 404b join inner scan plate 112 while eliminating lateral or pumping modes of motion.

While the particular arrangement illustrated by FIG. 4A includes separate suspension elements with three discrete connections to inner scan plate 112, a range of embodiments may be useful according to the application. For example, axial connections 404 could be increased in size or eliminated entirely. The number of discrete connections may be increased. Alternatively, the connections between the suspension could be made continuous with compliance determined by the amount of thinning between the outer extent of the suspension and the outer extent of the inner scan plate. In continuous suspension connections, variable compliance may be created by forming grooves of variable width or variable spacing between the outer extent of the suspension and outer extent of the inner scan plate. The number of discontinuous suspension elements may be increased above the two shown. Alternatively, the suspension may form a continuous structure around inner scan plate 112.

Figure 4B:
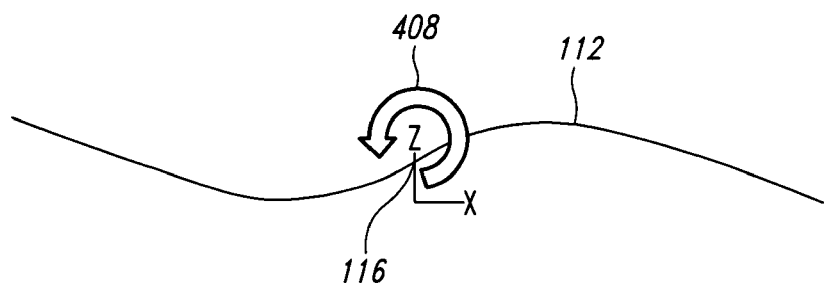
FIG. 4B is a side view of a MEMS scanner illustrating dynamic deformation of an unsuspended scan plate.

FIG. 4B is a side view of dynamic deformation of a conventional MEMS scan plate driven by torque applied to the center of the scan plate. Scan plate 112 is shown at maximum deformation, the amount of deformation being exaggerated for ease of understanding. Torque 408 is applied in a counterclockwise direction as shown, primarily by the torsional spring 114 (not shown). At maximum deformation, torque from the torsion arm at axis 116 causes the scan plate to rotate counterclockwise, while distributed inertial loads cause the ends of the scan plate to lag the center of the scan plate. It may be noted that for applications where the scan plate is being driven through the torsion arm by one or more actuators, such as the example of FIG. 4A, torque 408 is increased slightly relative to applications where the scan plate or suspension itself is being driven; but for resonant scanning, the vast majority of driving force is generated by energy stored in the springs (torsion arms).

Figure 4C:
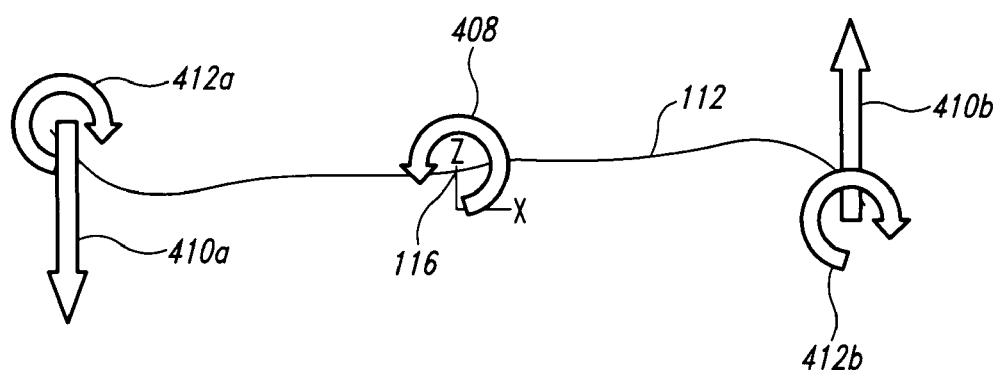
FIG. 4C is a side view of a MEMS scanner showing reduced dynamic deformation in the scan plate achieved by using a suspension.
Figure 4D:
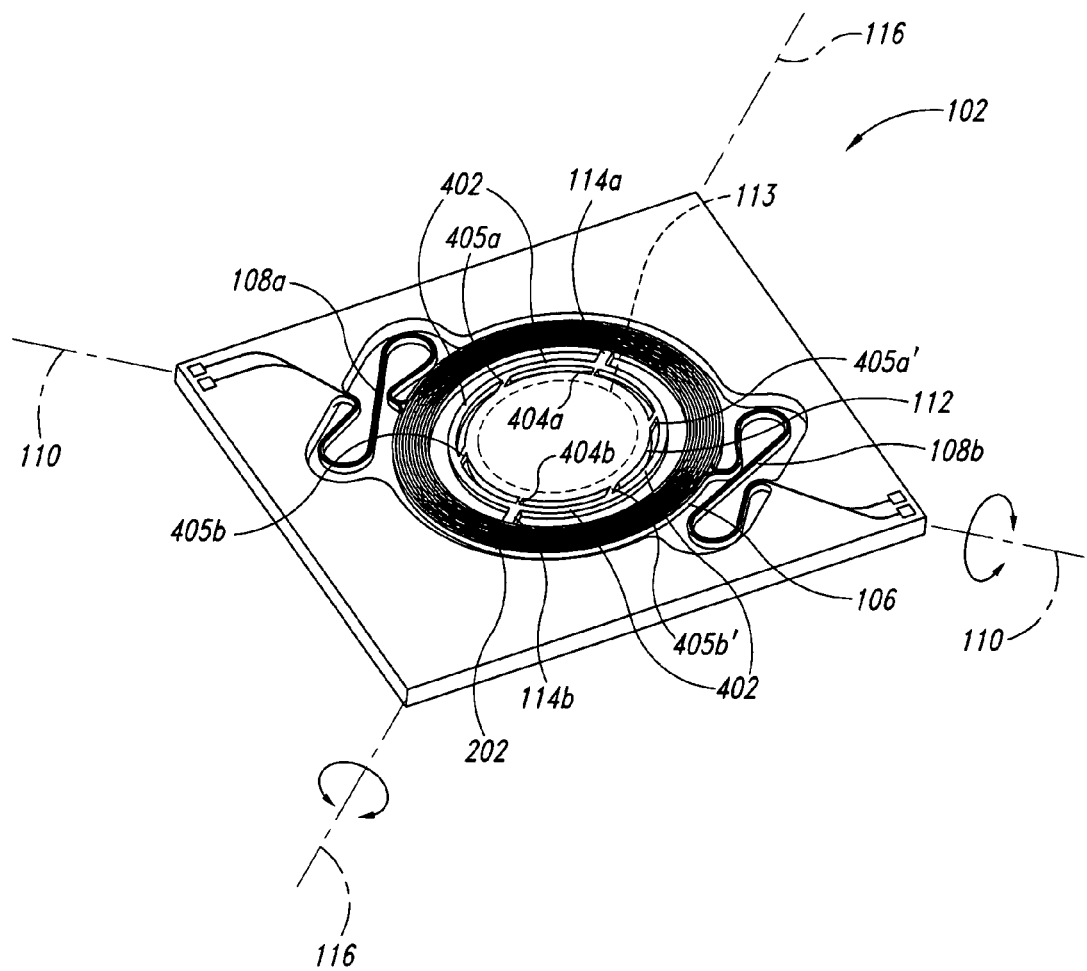

FIG. 4C is a side view of a MEMS scanner showing reduced dynamic deformation in the scan plate achieved by using a suspension. Scan plate 112 is shown at maximum deformation, being driven counterclockwise about axis 116. Lateral connections 405 (not shown) drive the scan plate counterclockwise as illustrated by tangential forces 410a and 410b. Additionally, axial connection 404 (not shown) drives the scan plate counterclockwise at axis 116 as shown by torque 408. Because suspension members 402 themselves (not shown) are dynamically deformed such that both left and right ends are rotated clockwise relative to the scan plate (in a manner akin to the deformation of the un-suspended scan plate 112 of FIG. 4B), torques 412a and 412b are additionally applied to the ends of the scan plate through respective lateral connections 405a and 405b (not shown). The combined effects of torques 408 and 412a tend to drive the left side of scan plate 112 downward while the combined effects of torques 408 and 412b tend to drive the right side of scan plate 112 upward, the effect of which helps keep the respective intermediate portions of scan plate 112 flat. Thus the use of a suspension partly or substantially overcomes the deformation related to inertial lag exhibited by the significantly deformed scan plate of FIG. 4B.

As implied above, because a large majority of the driving force in a resonant system comes from the stored energy in the torsion arms, the use of a suspension may be used to help maintain scan plate flatness for plates that are driven directly as well as for plates that are driven through torsion arms.

Figure 5:
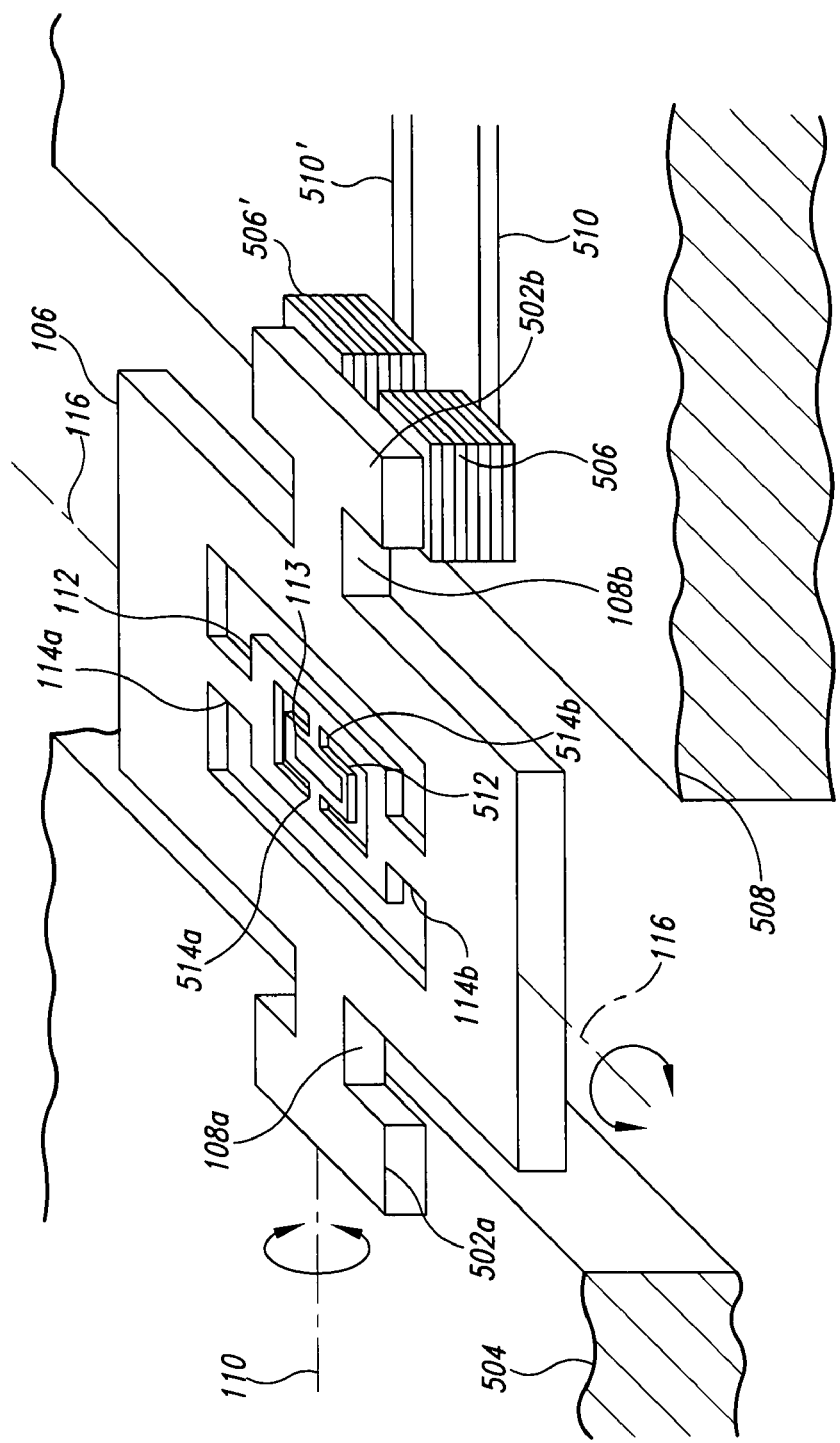
FIG. 5 is a view of a single axis MEMS scanner driven through sympathetic resonance from a piezoelectric actuator.

While the examples shown heretofore have used moving-coil magnetically driven actuators, other types of actuation technologies; including moving-magnet, electrocapacitive, piezoelectric, impact motor, fluid, and others; may be similarly multiplexed to generate movement in multiple axes. Additionally, the principles taught herein may be applied to driving single axis scanners through mechanical coupling across torsion arms. FIG. 5 is an example of a multi-axis scanner mechanically coupled across a torsion arm to stacked piezoelectric actuators. Gimbal 106 is suspended by torsion arms 108a and 108b. Torsion arm 108a terminates at an anchor pad 502a that is, in turn, attached to a fixed substrate 504. Torsion arm 108b terminates at a drive pad 502b that is coupled to piezoelectric stacks 506 and 506'. Piezoelectric stacks 506 and 506' are mounted on fixed substrate 508 and are coupled to a drive signal respectively by electrical traces 510 and 510' at their lower ends and are coupled in series by an electrical trace on their upper ends (trace not shown).

As an alternative to the example of FIG. 5, anchor pad 502a could be made into a drive pad by coupling it to a second pair of piezoelectric drive stacks, thus driving the assembly through both torsion arms 108a and 108b.

Piezoelectric stacks 506 and 506' may be such that when trace 510 is set to a higher voltage than trace 510', the potential causes stack 506 to extend and 506' to compress. When trace 510' is set to a higher voltage than trace 510, the opposite potential causes stack 506' to extend and stack 506 to compress. By energizing traces 510 and 510' with an alternating periodic signal, piezoelectric stacks 506 and 506' alternately extend and compress in opposition to one another, causing a slight twisting motion of drive pad 502b. In an alternative arrangement, piezoelectric stacks 506 and 506' may be driven independently, each through a pair of leads.

The slight twisting motion of drive pad 502b is transmitted as torsional stress through torsion arm 114b to gimbal 106. For a given drive frequency, the amplitude of movement of gimbal ring 106 (and other structures suspended therefrom) will be proportional to the voltage of the drive signal and to the mechanical amplification factor of the rotating mass at the drive frequency (although not necessarily linearly proportional). For drive frequency components at or near the resonance frequency of the gimbal ring (and suspended structures), the rotation of drive pad 502b will be amplified, a small amount of drive pad rotation corresponding to a relatively larger rotation of gimbal ring 106. For off resonance drive frequency components, the amplitude of rotation of the gimbal ring is reduced and, at certain frequency ranges, inverted.

Gimbal ring 112 may be caused to oscillate periodically by introducing an asymmetry to the system. Such an asymmetry may include a mass asymmetry about one or more axes of rotation (thus introducing a slight bending mode in the respective plate or gimbal), a rotation axis asymmetry (e.g. axis 116 not being at a perfectly right angle to axis 110), or a drive asymmetry.

A drive asymmetry may be introduced by superimposing one or more in-phase frequency components to piezo stacks 506 and 506'. Such a drive asymmetry results in a slight upward-downward periodic motion of the drive pad 506. This slight upward-downward periodic motion (which may be of the same or opposite sign compared to the upward-downward motion of the drive pad 506) is communicated through gimbal ring 106 as a slight rotation about axis 116. The rotation of gimbal ring 106 about axis 116 is then amplified as a function of the mechanical amplification factor of gimbal ring 112 (with carried components including torsion arms 514a,b and inner scan plate 512), resulting in an intended rotation of gimbal ring 112 about axis 116.

As may be seen, the mechanical coupling may be extended to additional scan plates. Scan plate 112 acts as a gimbal ring for inner scan plate 512, which is suspended from scan plate 112 by torsion arms 514a and 514b. In the example of FIG. 5, inner scan plate 512 is formed to rotate about axis 110. When the drive signal energizing traces 510 and 510' further comprises a frequency component equal to the resonant frequency of scan plate 512, the slight twisting of drive pad 506 arising therefrom is transmitted through torsion arm 108b, gimbal ring 106, torsion arms 114a and 114b, scan plate 112, and torsion arms 514a and 514b to scan plate 512 so as to drive scan plate 512 to rotate about axis 110 at a transmitted frequency where the mechanical amplification factor of inner scan plate 512 results in rotation.

In some embodiments, scan plate 512 may include a mirror 113 formed thereon. One application for such a device is to create a raster pinch correction mirror in a 2D beam scanning system. The phase relationships between and amplitudes of the various frequency components of the drive signal may be controlled. In a raster pinch correcting system, inner scan plate 512 may be designed to have a resonant frequency twice that of scan plate 112. Its phase and amplitude may be selected to create a vertical scan moving in opposition to and substantially equal to the vertical scan motion of gimbal 106 while scan plate 112 is traversing across its scan range, and in the same direction as gimbal 106 while scan plate 112 is at the end of its travel. Thus, the mirror 113 may deflect a beam comprising substantially parallel paths in both left-to-right and right-to-left scanning directions, substantially eliminating raster pinch.

As may be seen, additional levels of scan plates may be nested and driven without incurring the additional expense, yield loss, and electrical loss associated with the formation of additional nested actuators. One consideration is that successive scan plates are driven via at least minimal resonant response of intermediate plates, expressed in the primary axis of motion of the finally driven plate.

Alternatively, scan plates 112 and 512 could be eliminated and the system used to drive a single-axis scan plate 106. As may be appreciated, various combinations of the embodiments of FIGS. 1, 3, 4, and 5 could be constructed within the scope of the invention.

Figure 6:
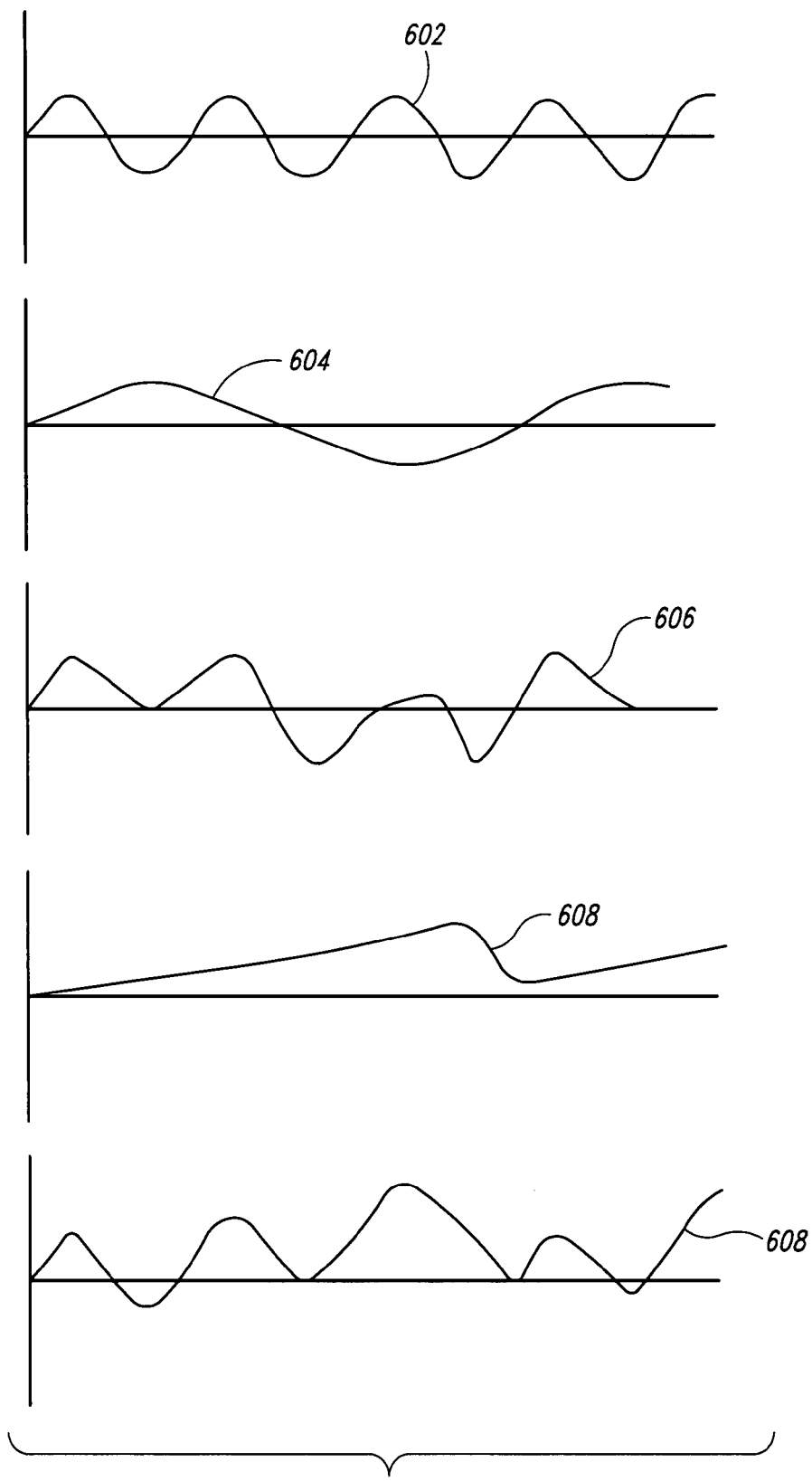
FIG. 6 shows individual and multiplexed waveforms for driving a two-axis MEMS scanner.

As described above, the drive signals for actuating many of the embodiments according to the invention involve combinations of waveforms. By selecting mechanical amplification factors, resonant frequencies, and drive signals acting on various portions of the MEMS apparatus, a broad range of design freedom may be enjoyed. FIG. 6 shows an example of waveforms for driving a plurality of oscillating elements. Waveform 602 is a high frequency signal for driving a first oscillator component at a corresponding high resonant frequency. Waveform 604 is a lower frequency signal for driving a second oscillator component at a corresponding lower resonant frequency. Waveform 606 combines the signals of waveforms 602 and 604. A signal corresponding to waveform 606 may be transmitted to the actuator or actuators of MEMS scanners constructed according to the invention. Each frequency component 602 and 604 will thus actuate a particular oscillating element in accordance with its resonant frequency and amplification factor.

Waveform 608 is a non-resonant signal for driving a scanner component in a non-resonant manner. Waveform 610 combines the signals of waveforms 602 and 608. A signal corresponding to waveform 610 may be transmitted to MEMS scanners constructed according to the invention. When the amplification factor of a scanner component having a resonant frequency corresponding to signal 602 is sufficiently high, the component will reject signals of different frequencies. Conversely, scanner components that have low amplification factor will tend to receive a broad range of signals. Signal component 608 of waveform 610 may, for example, result in a progressive scan and flyback of a low amplification factor gimbal ring having a relatively large number of actuator coil windings while signal component 602 of waveform 610 drives its nested high amplification factor inner scan plate.

Figure 7A:
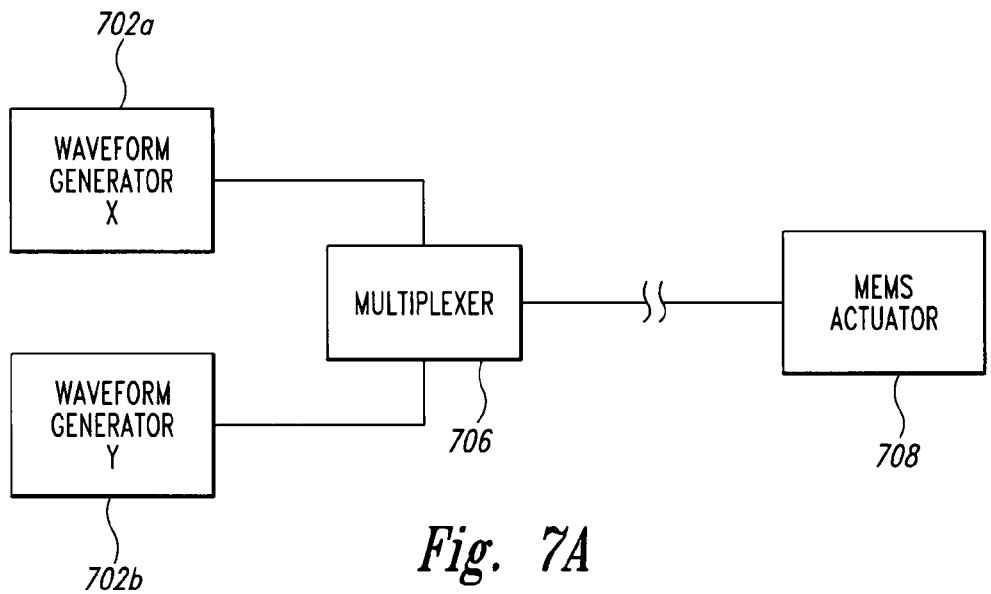
FIG. 7A is a block diagram of a driving circuit for driving a single or series actuator to induce movement in two axes.

FIG. 7A is a block diagram of a signal generator that combines individual signal components into a drive signal for driving a MEMS scanner having components preferentially responsive to each of the signal components. X-axis waveform generator 702a and y-axis waveform generator 702b each generate a respective signal for driving a MEMS scanner to move about the x and y-axes. Such movement may be rotational, translational, or other modes as appropriate for the application. Waveforms such as those shown in FIG. 6 may be used for example. If waveform generator 702a generates waveform 602 and waveform generator 702b generates waveform 604, they may be combined in multiplexer (MUX) 706 to produce combined waveform 606. Alternatively waveform generator 702b may generate a non-sinusoidal signal such as waveform 608. In that case MUX 706 may combine the waveforms generated in waveform generator 702a and 702b to produce a signal such as waveform 610. The combined waveform is transmitted to a MEMS actuator 708, which may be of many forms including series coils 118 and 120 of FIG. 1, combined drive coil 202 FIGS. 3A, 3B, 3C and 4, piezoelectric stacks 506 and 506' of FIG. 5, or other types of actuators. As an alternative to discrete waveform generators 702a and 702b, an integrated device may produce drive waveforms such that individual components (for example waveforms 602 and 604) are not exposed or literally present.

Figure 7B:
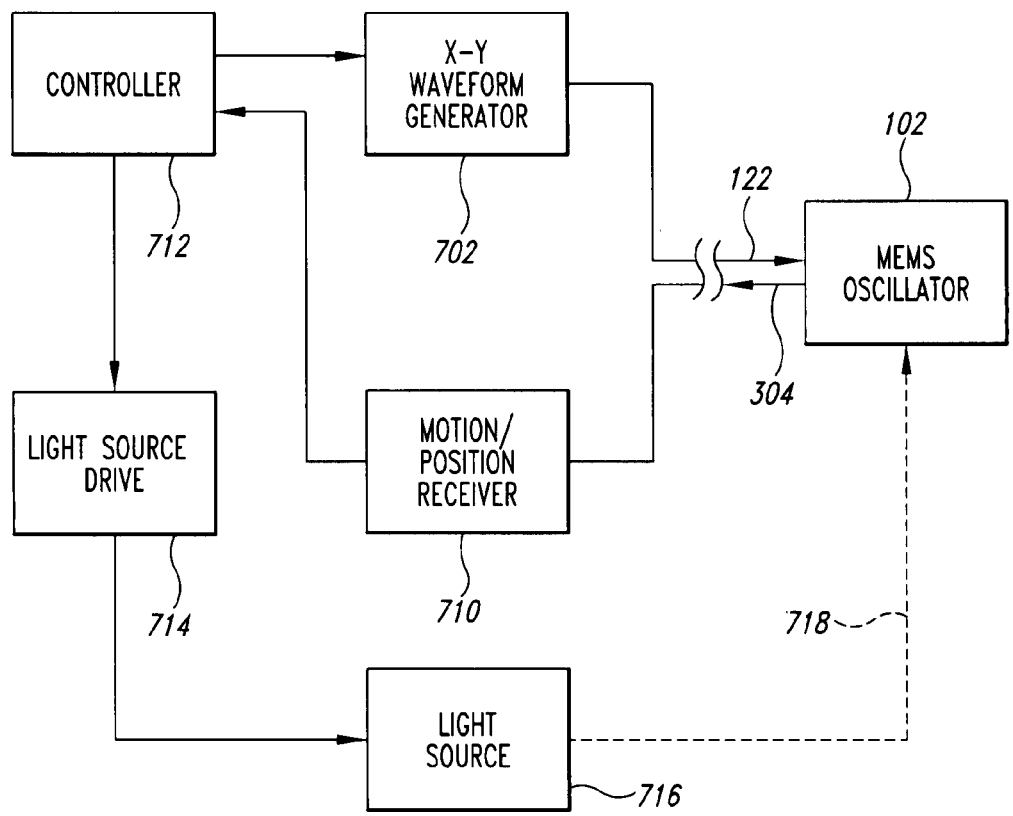
FIG. 7B is a block diagram of a MEMS controller that includes provision for position feedback.

FIG. 7B illustrates a MEMS drive block diagram having an integrated x-y waveform generator 702 and a motion/position detector 710 connected to a controller 712. Controller 712 issues waveform parameters to x-y waveform generator 702. X-Y waveform generator 702 creates drive waveforms and transmits them to a MEMS scanner 102 via drive traces 122. The physical position and/or motion is sensed and transmitted from the MEMS scanner 102 to a motion/position receiver 710 via sense traces 304. Motion position receiver 710 informs controller 712 of the motion and/or position of the MEMS scanner. The controller may then maintain or modify the waveform parameters sent to the x-y waveform generator depending upon whether or not the MEMS scanner is performing the desired motion. Controller 712 may instruct the light source drive 714 to vary the sequential emission pattern of light source 716 to perform image remapping to take into account the actual position of the mirror on MEMS scanner 102. Light source 716 emits a beam 718, which is deflected by the mirror on MEMS scan plate 112 onto a field-of-view corresponding to the sensed position of the scan plate.

Figure 8:
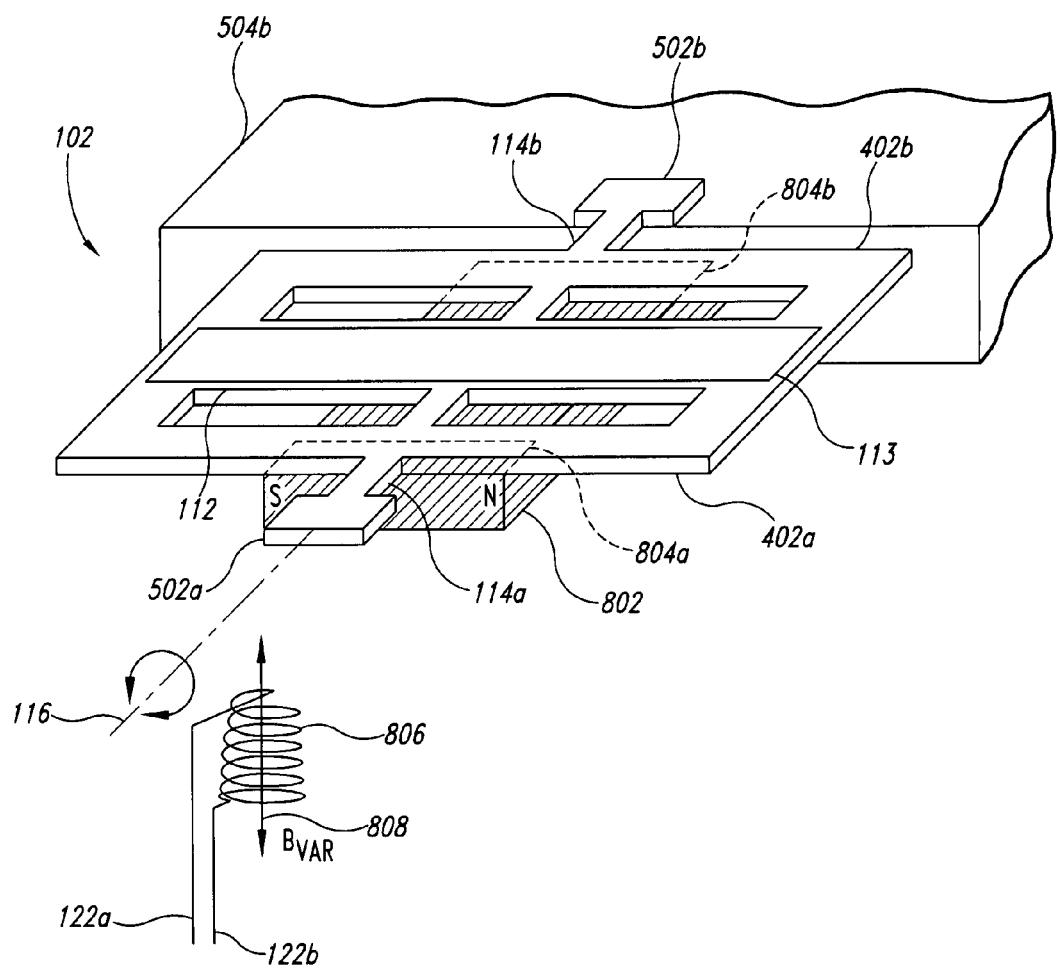
FIG. 8 is a view of a single axis moving magnet scanner.

While magnetic drive designs shown heretofore have been moving coil types, it is also possible to apply the principles described herein to moving magnet MEMS designs. FIG. 8 shows a single axis moving magnet MEMS scanner having suspension elements for reducing mirror distortion. Scan plate 112 has mirror 113 on its surface. Scan plate 112 is suspended from torsion arms 114a and 114b, which, in turn, terminate at anchor pads 502a and 502b, respectively. Anchor pads 502a and 502b are attached respectively to substrates 504a (not shown) and 504b. Drive magnet 802, which may be a permanent magnet or an electromagnet, is attached to the scanner assembly at attachment points 804a and 804b as indicated in the Figure. North and south poles of drive magnet 802 are aligned respectively to the right and left sides of magnet as indicated in the Figure.

Actuator coil 806 is be placed below scanner 102 on its centerline as indicated. Alternatively, actuator coil 806 may be placed at a different location such as in-plane or above scanner 102. Actuator coil 806 is energized by leads 122a and 122b to create a variable magnetic B fields 808. When electromagnet 806 is energized to produce a magnetic be field 808 oriented north up, the south pole of drive magnet 802 is attracted thereto and the north pole of drive magnet 802 repelled therefrom, causing scanner 102 to rotate counter-clockwise about axis 116. Conversely, when electromagnet 806 drives magnetic field 808 south up, the south pole of drive magnet 802 is repelled and the north pole attracted, causing scanner 102 to rotate clockwise about axis 116.

Drive magnet 802 is affixed to the scanner assembly at attachment points 804a and 804b as indicated. A moving magnet actuator and torsion spring energy storage can cooperate to generate a significant amount of torque, which could distort mirror 113 if drive magnet 802 and torsion arms 114a and 114b were affixed directly thereto. Instead, attachment of drive magnet 802 and torsion arms 114a and 114b to respective suspension elements 402a and 402b confines distortion to the suspension elements, keeping mirror surface 113 flat as illustrated in FIGS. 4B and 4C. Suspension elements 402a and 402b may be attached to oscillating mass 112 in various arrangements. In some embodiments it may be optimal to attach suspension elements 402 to oscillating mass 112 at three points as indicated. Finite element analysis can aid the designer in selecting optimum attachment points.

As an alternative to suspending oscillating mass 112 from a pair of torsion arms, various cantilevered or other designs may be substituted.

Figure 9:
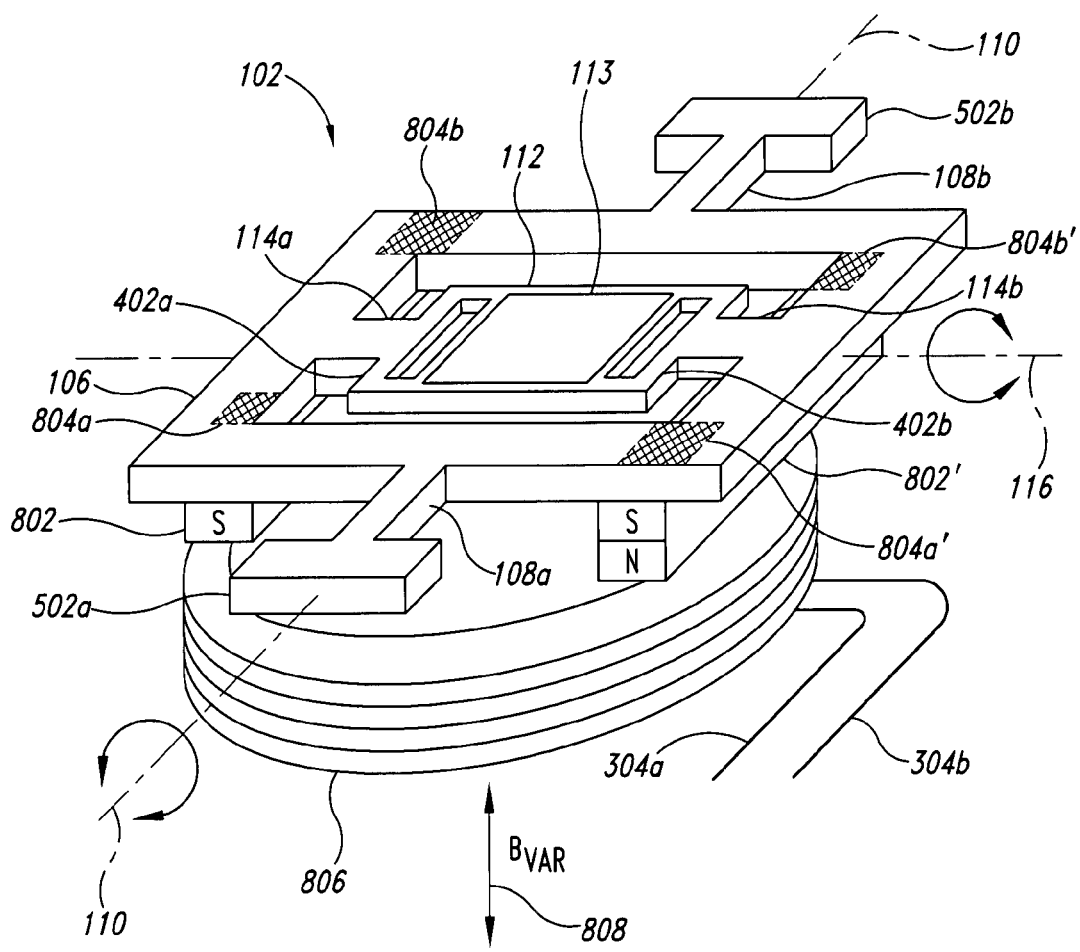
FIG. 9 is a view of a two-axis moving magnet scanner having opposed fixed magnetic fields.

FIG. 9 shows a moving magnet embodiment of a two-axis MEMS scanner 102. As with the MEMS scanners of FIG. 8 and FIG. 5, anchor pads 502a and 502b attach the assembly to mounting points. Torsion arms 108a and 108b extending therefrom support gimbal ring 106. Gimbal ring 106, in turn, serves as an anchor for torsion arms 114a and 114b, which connect to suspension elements 402a and 402b, respectively. Suspension elements 402a and 402b connect to oscillating mass 112 which has a mirror surface 113 disposed thereon.

Two drive magnets 802 and 802' may be affixed to gimbal ring 106 as shown to provide actuation force. Drive magnet 802 is attached to gimbal ring 106 at attachment points 804a and 804b where the dotted lines represent locations on the bottom surface of gimbal ring 106. Similarly, drive magnet 802' is attached to gimbal ring 106 at attachment points 804a' and 804b'. In some embodiments, it may be desirable to arrange the north and south poles of drive magnets 802 and 802' to be anti-parallel to one another as indicated. Such an arrangement allows a single actuator to create opposing forces in the drive magnets for rotating the assembly around axis 110.

The moving magnet oscillating assembly of FIG. 9 is driven by an electromagnetic actuator 806, which, for example, may be disposed below the plane of the MEMS scanner as indicated. As may be appreciated by those having skill in the art, other positions for electromagnet 806 are also possible. Drive magnet 806 is driven to produce a variable magnetic B field 808 via leads 304a and 304b. When electromagnet 806 is driven to produce a variable magnetic field 808 with north up, drive magnet 802 is attracted thereto while drive magnet 802' is repulsed therefrom. This produces torsional force in the counterclockwise direction about axis 110 and drives the scan plate to rotate counterclockwise. Conversely, when variable magnetic field 808 is driven south up, Drive magnet 802 is repulsed and drive magnet 802' is attracted, producing rotation in the clockwise direction about axis 110.

Various waveforms may be used to drive rotation about axis 110. For example, a sinusoidal waveform such as waveform 604 of FIG. 6 may, with proper frequency selection, produce resonant rotation about axis 110. In other embodiments, a ramped waveform approximating a sawtooth waveform, such as waveform 608 of FIG. 6 may be used to produce non-sinusoidal, non-resonant motion.

As indicated above, one scan plate 112 is suspended from the gimbal ring 106 on torsional arms 114a and 114b. As with other examples, the mass distribution of scan plate 112 and the stiffness of torsion arms 114a and 114b determine a resonant frequency and mechanical amplification factor for scan plate 112. In a manner similar to other examples, electromagnet 806 may be driven with a composite waveform comprising a plurality of frequency components.

Of note in the example of FIG. 9, is the asymmetry of the placement of the drive magnets 802 and 802'. Drive magnet 802 is mounted at its far end at outer position 804b and its near end (respectively, as pictured) at inner position 804a. The asymmetry of drive magnet 802' is reversed, with its near end being mounted in an outer position 804a' and its far end mounted at an inner position 804b'. This drive asymmetry results in a slight rotation of gimbal ring 106 about axis 116.

When variable B field 808 is driven with a frequency component having a frequency equal or near to the resonant frequency of scan plate 112, scan plate 112 will be sympathetically driven to oscillate about axis 116. In a manner similar to the MEMS devices of FIGS. 4 and 5, slight twisting of gimbal ring 106 about axis 116 is amplified by the resonant system of scan plate 112, creating torsional force through torsion arms 114a and 114b. Though the overall twisting of gimbal ring 106 maybe slight, the amount of torque transmitted to scan plate 112, arising both from driving torque and energy stored in torsion arms 114a and 114b, may be sizable. To reduce the tendency of this torsional force to distort scan plate 112, and hence mirror surface 113, suspension elements 402a and 402b are interposed between scan plate 112 and torsion arms 114a 114b, respectively.

Thus a composite drive signal such as waveforms 606 or 610 may be fed through leads 304a and 304b to produce movement in two or more axes according to the resonant properties of the oscillating components.

As described above, one or more other asymmetries including rotation axis asymmetry and/or mass distribution asymmetry, could alternatively or additionally be used to drive rotation of scan plate 112.

As an alternative to the sympathetic drive system of FIG. 9, each of the various oscillating components could be driven directly by placement of drive magnets thereon.

As with other examples presented herein, a DC bias current in coil 806 in either direction will tend to shift the amplitude of rotation of the driven member (i.e. gimbal ring 106 in the example of FIG. 9) to one side or the other depending upon the direction of the DC bias. This effect is especially pronounced with magnetic drive, owing to the relatively high drive torque of such systems. Such a DC bias current may be used to vary or adjust the nominal direction in which mirror 103 is aimed. This may be useful, for example, to change the exit pupil position of a scanned beam display or to pan the field-of-view for a scanned beam image capture device.

While FIG. 9 shows a two axis, two body scanner (i.e. a single scan plate and a single gimbal ring), it may be appreciated that the moving magnet design may be readily applied to single-axis, greater than two axes, single-body, or greater than two bodies applications as well.

As mentioned earlier, the principles described herein may be applied to the various MEMS Drive systems, magnetic or non-magnetic. For example, electrocapacitive drive pads or electrocapacitive interdigitated arms could be substituted for the drive magnets and electromagnets used in the previous examples. Alternatively, thermal, fluidic, or other actuation mechanisms could be substituted and remain within the intended scope.

Figure 10:
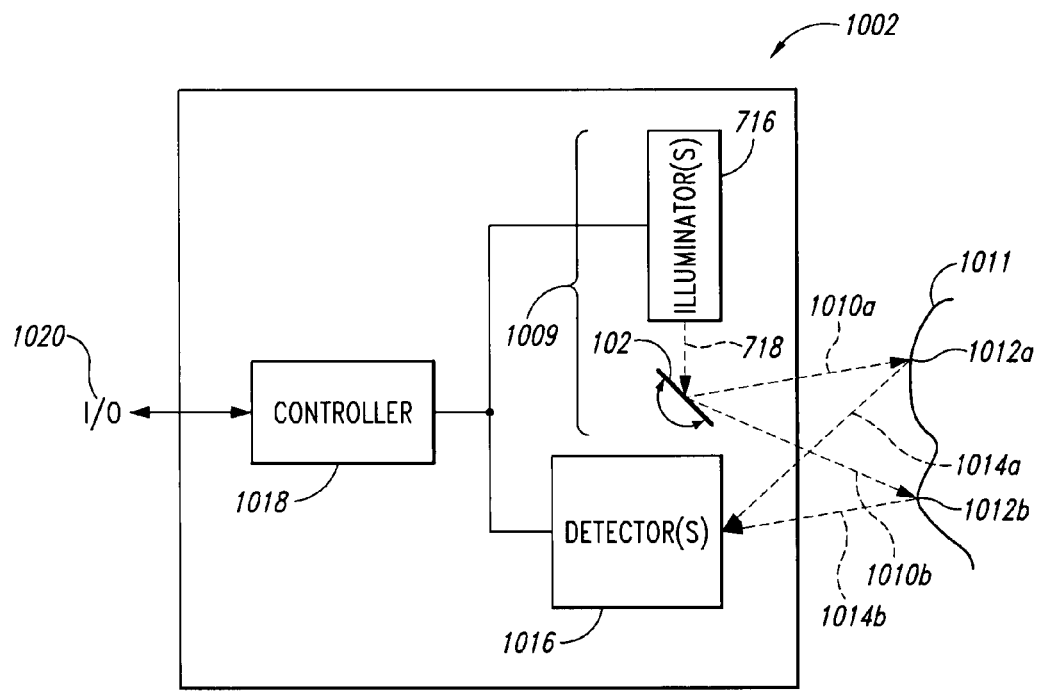
FIG. 10 is a block diagram of a scanned beam imager with a MEMS scanner.

Various embodiments of MEMS scanners described herein may be employed to scan beams of light in a scanned beam image capture apparatus, scanned beam displays, laser printer imaging systems, or other applications. A simplified block diagram of a scanned beam image capture apparatus 1002 is shown in FIG. 10. An illuminator 716 creates a first beam of light 718. A scanner 102, having a mirror formed thereon, deflects the first beam of light across a field-of-view (FOV) to produce a second scanned beam of light 1010. Taken together, the illuminator 716 and scanner 102 comprise a variable illuminator 1009. Instantaneous positions of scanned beam of light 1010 may be designated as 1010a, 1010b, etc. The scanned beam of light 1010 sequentially illuminates spots 1012 in the FOV. The scanned beam 1010 at positions 1010a and 1010b illuminates spots 1012a and 1012b in the FOV, respectively. While the beam 1010 illuminates the spots, a portion of the illuminating light beam 1014 is reflected according to the properties of the object or material at the spots to produce scattering or reflecting the light energy. A portion of the scattered light energy travels to one or more detectors 1016 that receive the light and produce electrical signals corresponding to the amount of light energy received. The electrical signals drive a controller 1018 that builds up a digital representation and transmits it for further processing, decoding, archiving, printing, display, or other treatment or use via interface 1020.

The light source 716 may include multiple emitters such as, for instance, light emitting diodes (LEDs), lasers, thermal sources, arc sources, fluorescent sources, gas discharge sources, or other types of illuminators. In one embodiment, illuminator 716 comprises a red laser diode having a wavelength of approximately 635 to 670 nanometers (nm). In another embodiment, illuminator 716 comprises three lasers; a red diode laser, a green diode-pumped solid state (DPSS) laser, and a blue DPSS laser at approximately 635 nm, 532 nm, and 473 nm, respectively. While laser diodes may be directly modulated, DPSS lasers generally require external modulation such as an acousto-optic modulator (AOM) for instance. In the case where an external modulator is used, it is typically considered part of light source 716. Light source 716 may include, in the case of multiple emitters, beam combining optics to combine some or all of the emitters into a single beam. Light source 716 may also include beam-shaping optics such as one or more collimating lenses and/or apertures. Additionally, while the wavelengths described in the previous embodiments have been in the optically visible range, other wavelengths are within the scope of the invention.

As mentioned earlier, embodiments according to the invention may be applied not only to scanning mirrors, but to other types of MEMS devices as well. For example, a scan plate may have light emitters or a fiber optic termination thereon in place of a mirror. Such devices may be used to directly move the light beam in one or more axes in place of or auxiliary to a scanning mirror 103.

Light beam 718, while illustrated as a single beam, may comprise a plurality of beams converging on a single scanner 102 or onto separate scanners 102.

A 2D MEMS scanner 102 scans one or more light beams at high speed in a pattern that covers an entire 2D FOV or a selected region of a 2D FOV within a frame period. A typical frame rate may be 60 Hz, for example. Often, it is advantageous to run one or both scan axes resonantly. In one embodiment, one axis is run resonantly at about 19 KHz while the other axis is run non-resonantly in a sawtooth pattern to create a progressive scan pattern. A progressively scanned bi-directional approach with a single beam, scanning horizontally at scan frequency of approximately 19 KHz and scanning vertically in sawtooth pattern at 60 Hz can approximate SVGA resolution. In one such system, the horizontal scan motion is driven electrocapacitiveally and the vertical scan motion is driven magnetically. Alternatively, both the horizontal and vertical scan may be driven magnetically or capacitively. Electrocapacitive driving may include electrocapacitive plates, comb drives or similar approaches. In various embodiments, both axes may be driven sinusoidally or resonantly. Other driving methodologies as described above or as may be clear to one having skill in the art may alternatively be used.

Several types of detectors may be appropriate, depending upon the application or configuration. For example, in one embodiment, the detector may include a PIN photodiode connected to an amplifier and digitizer. In this configuration, beam position information is retrieved from the scanner or, alternatively, from optical mechanisms, and image resolution is determined by the size and shape of scanning spot 1012. In the case of multi-color imaging, the detector 1016 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, photodetectors such as PIN photodiodes, APDs, and PMTs may be arranged to stare at the entire FOV, stare at a portion of the FOV, collect light retrocollectively, or collect light confocally, depending upon the application. In some embodiments, the photodetector 1016 collects light through filters to eliminate much of the ambient light.

The scanned beam image capture device may be embodied as monochrome, as full-color, and even as a hyper-spectral. In some embodiments, it may also be desirable to add color channels between the conventional RGB channels used for many color cameras. Herein, the term grayscale and related discussion shall be understood to refer to each of these embodiments as well as other methods or applications within the scope of the invention. Pixel gray levels may comprise a single value in the case of a monochrome system, or may comprise an RGB triad or greater in the case of color or hyper-spectral systems. Control may be applied individually to the output power of particular channels (for instance red, green, and blue channels) or may be applied universally to all channels, for instance as luminance modulation.

Figure 11:
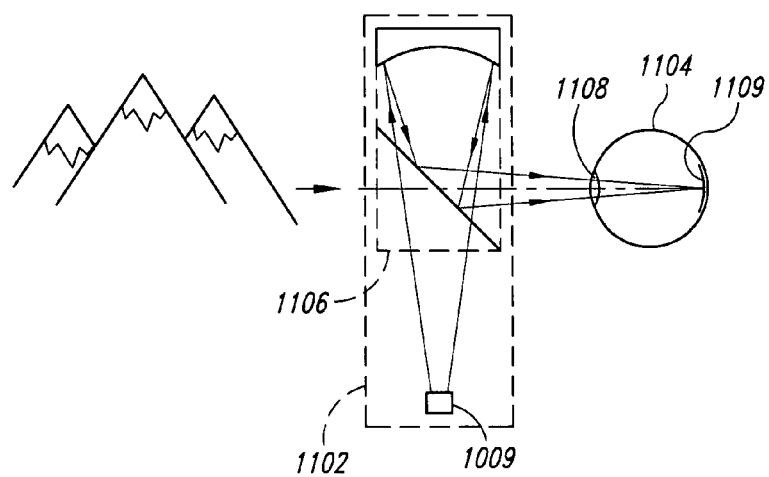
FIG. 11 is a diagram of a scanned beam display.

Other applications for the MEMS scanners and actuation mechanisms described herein include scanned beam displays such as that described in U.S. Pat. No. 5,467,104 of Furness et al., entitled VIRTUAL RETINAL DISPLAY, which is incorporated herein by reference. As shown diagrammatically in FIG. 11, in one embodiment of a scanned beam display 1102, a scanning source 1009 outputs a scanned beam of light that is coupled to a viewer's eye 1104 by a beam combiner 1106. In some scanned displays, the scanning source 1009 includes a MEMS scanner with a mirror, as described elsewhere in this document, that scans a modulated light beam onto a viewer's retina. In other embodiments, the scanning source may include one or more light emitters that are rotated through an angular sweep.

The scanned light enters the eye 1104 through the viewer's pupil 1108 and is imaged onto the retina 1109 by the cornea. In response to the scanned light the viewer perceives an image. In another embodiment, the scanned source 1009 scans the modulated light beam onto a screen that the viewer observes. One example of such a scanner suitable for either type of display is described in U.S. Pat. No. 5,557,444 to Melville et al., entitled MINIATURE OPTICAL SCANNER FOR A TWO-AXIS SCANNING SYSTEM, which is incorporated herein by reference.

Sometimes such displays are used for partial or augmented view applications. In such applications, a portion of the display is positioned in the user's field of view and presents an image that occupies a region 43 of the user's field of view 1204, as shown in FIG. 12A. The user can thus see both a displayed virtual image 1206 and background information 1208. If the background light is occluded, the viewer perceives only the virtual image 1206, as shown in FIG. 12B. Applications for see-through and occluded displays include head-mounted displays and camera electronic viewfinders, for example.

As mentioned above in conjunction with the description of FIG. 5, one use of various embodiments of the MEMS scanners described herein is as raster pinch correcting scanners. FIG. 13 illustrates a scan path 1302 followed by a scanned beam emitted by various devices including scanned beam image capture devices as exemplified in FIG. 10 and scanned beam displays as exemplified in FIG. 11. Though FIG. 13 shows only eleven lines of image, one skilled in the art will recognize that the number of lines in an actual display or imager will typically be much larger than eleven. As can be seen by comparing the actual scan pattern 1302 to a desired raster scan pattern 1304, the actual scanned beam 1302 is "pinched" at the outer edges of the field of view. That is, in successive forward and reverse sweeps of the beam, the pixels near the edge of the scan pattern are unevenly spaced. This uneven spacing can cause the pixels to overlap or can leave a gap between adjacent rows of pixels. Moreover, because the image information is typically provided as an array of data, where each location in the array corresponds to a respective position in the ideal raster pattern 1304, the displaced pixel locations can cause image distortion.

To improve the quality of the image displayed or captured, it is desirable to correct the "pinched" scan path 1302 to more nearly approximate the ideal raster pattern 1304. One way to do this is to provide a separate beam path correction mirror as described in some of the patents cited and incorporated by reference near the end of this detailed description section. However, a separate correction mirror can have undesirable cost, size, and complexity impacts. For many applications, it may be desirable to instead use a scanner assembly 102 that includes a correction feature.

Figure 14:
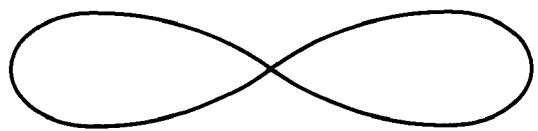
FIG. 14 is a Lissajous scan pattern that may be created by a correction mirror resonating at twice the frequency of a fast scan mirror.
Figure 15:
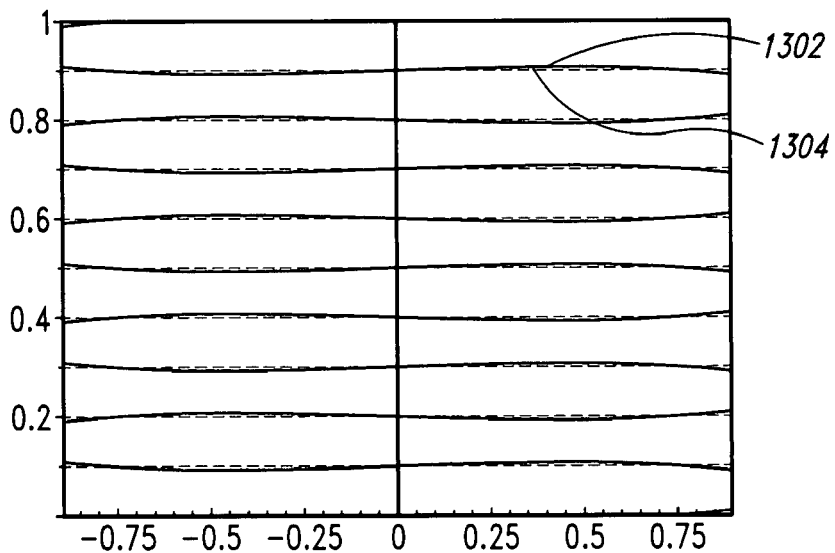
FIG. 15 is a beam position diagram showing a corrected scan path formed by superimposing the pattern of FIG. 14 over a linear vertical scan.

Referring back to FIG. 5, one may note that inner scan plate 512 with mirrored surface 113 may be driven to scan around axis 110 in common with outer gimbal 106. If inner scan plate 512 is driven at a frequency twice that of horizontal scan plate 112 at a proper phase relationship, it may be appreciated (absent any motion by gimbal 106) that a scanned beam reflected from mirror 113 could trace a "bow tie" or Lissajous pattern as shown by FIG. 14. Combining the Lissajous pattern of FIG. 14 with vertical, substantially constant rotational velocity scanning by gimbal 106 produces the corrected scan pattern indicated by FIG. 15. FIG. 15 shows correction of the "pinched" scan path with a sinusoidal motion of the correction mirror where the horizontal field of view encompasses 90 percent of the overall horizontal scan angle. One skilled in the art will recognize that the error in position of the beam can be reduced further if the field of view is a smaller percentage of the overall horizontal scan angle.

Correction scanners may be sympathetically or directly driven. Of course, it is not necessary to use the stacked piezoelectric drive mechanism of FIG. 5. Other drive mechanisms including moving coil magnetic, moving magnet magnetic, electrocapacitive, differential thermal expansion, etc. may be used.

Further reductions in the scan error can be realized by adding one or more additional correction mirrors to scanner 102. Such scan plates may be added in a nested fashion as indicated in FIG. 5 or, with the use of a "double bounce" or other beam path that returns the beam to the plane of the substrate of scanner 102, may be positioned laterally in either axis to first scan mirror 113. Another approach to reducing the error is to add one or more higher order harmonics to the scanner drive signal so that the scanning pattern of the inner scan plate 512, here acting as a resonant correction scanner, shifts from a sinusoidal scan closer to a sawtooth wave that approximates more precisely the movement of gimbal 106.

Other uses for various embodiments of the MEMS scanner described herein will be apparent to one having skill in the art.

Various embodiments of the MEMS scanner described herein may be integrated into systems and/or combined with embodiments described in U.S. Pat. Nos. 6,140,979, entitled SCANNED DISPLAY WITH PINCH, TIMING, AND DISTORTION CORRECTION; 6,245,590, entitled FREQUENCY TUNABLE RESONANT SCANNER AND METHOD OF MAKING; 6,285,489, entitled FREQUENCY TUNABLE RESONANT SCANNER WITH AUXILIARY ARMS; 6,331,909, entitled FREQUENCY TUNABLE RESONANT SCANNER; 6,362,912, entitled SCANNED IMAGING APPARATUS WITH SWITCHED FEEDS; 6,384,406, entitled ACTIVE TUNING OF A TORSIONAL RESONANT STRUCTURE; 6,433,907, entitled SCANNED DISPLAY WITH PLURALITY OF SCANNING ASSEMBLIES; 6,512,622, entitled ACTIVE TUNING OF A TORSIONAL RESONANT STRUCTURE; 6,515,278, entitled FREQUENCY TUNABLE RESONANT SCANNER AND METHOD OF MAKING; 6,515,781, entitled SCANNED IMAGING APPARATUS WITH SWITCHED FEEDS; and/or 6,525,310, entitled FREQUENCY TUNABLE RESONANT SCANNER; for example; all commonly assigned herewith and all hereby incorporated by reference.

Alternatively, illuminator 104, scanner 102, and/or detector 116 may comprise an integrated beam scanning assembly as is described in U.S. Pat. No. 5,714,750, BAR CODE SCANNING AND READING APPARATUS AND DIFFRACTIVE LIGHT COLLECTION DEVICE SUITABLE FOR USE THEREIN which is incorporated herein by reference.

As indicated above in conjunction with the discussion of FIGS. 1, 3A, 4A, 5, 6, 7A, 7B, and 9, rotation or other movement about various axes is determined according to the physical response of the moving body. In those discussions, there was assumed to be little interaction between the various axes of rotation or other movement. In real-world scenarios however the interaction between modes and moving bodies may be significant.

Figure 16:
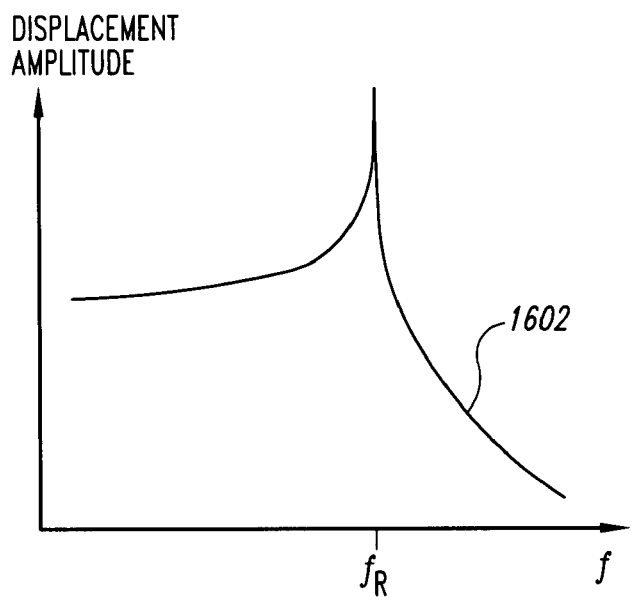
FIG. 16 is a response curve of a simple resonant body.

FIG. 16 illustrates a simplified response curve 1602 for rotation of a scan plate having a resonant frequency $f_R$. In this figure the vertical axis is denoted displacement amplitude, and indicates a physical response. While a rotational response is plotted by the curve 1602 of FIG. 16, other response modes may be similarly represented. For example, a "pumping mode" would involve up-down translational movement. The coupling between portions of scanners may thus be used to drive modes other than rotation.

Figure 17:
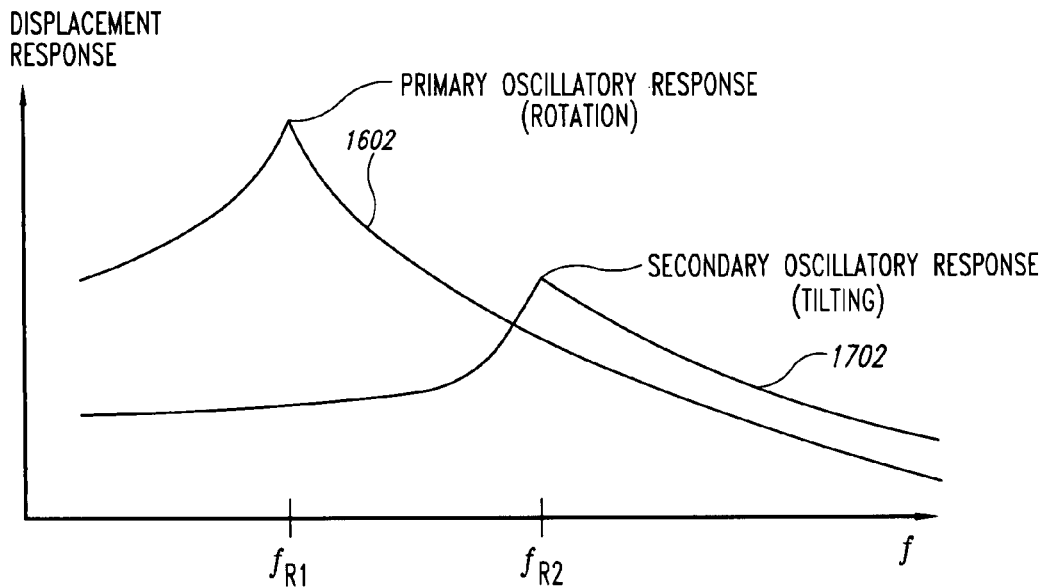
FIG. 17 shows response curves for two modes of a resonant body.

As is characteristic of many response curves, the displacement amplitude of the oscillating body increases monotonically with frequency until it nears its resonant frequency, at which point the response climbs rapidly to a finite level corresponding to mechanical amplification factor of the body at its resonant frequency. As frequency is increased further the curve drops, sometimes precipitously, as the body is no longer able to respond at the rate of the drive signal. It is frequently convenient to design systems to drive the MEMS device at or near its resonant frequency to conserve energy and reduce power consumption.

Where the response curve of FIG. 16 indicates response of a single oscillating body around a single axis, the response curves of FIG. 17 show the response for a body around multiple axes. Here again, frequency is plotted along the horizontal axis increasing to the right and the displacement response amplitude is plotted on the vertical axis with larger displacement higher on the axis. The primary oscillatory response curve 1602 has a resonant frequency at $f_{R1}$ and is similar in shape to the response curve 1602 shown in FIG. 16. Also shown in FIG. 17 is a secondary oscillatory response curve 1702. Response curve 1702 indicates the response of the body along some other movement axis and represents a second excitation mode. For the present discussion it is assumed the primary oscillatory response 1602 measures rotation around an axis defined by a pair of torsion arms. The secondary oscillatory response curve 1702 represents a tilting response for rotation about an axis in plane and orthogonal to the primary axis of rotation. The primary oscillatory response may be envisioned as rotation about a pair of torsion arms. The secondary oscillatory response can be envisioned as tilting with the pair of torsion arms alternately bending up and bending down out of the plane of the device.

It should be noted that the secondary response curve 1702 displays a second resonant frequency $f_{R2}$ that may be the same as or different from the primary mode resonance frequency $f_{R1}$. For the present discussion it is assumed that $f_{R2}$ is somewhat higher in frequency that $f_{R1}$ and that the maximum displacement response amplitude in the secondary axis (the mechanical amplification factor) is lower than the amount of response of the primary axis.

Figure 18:
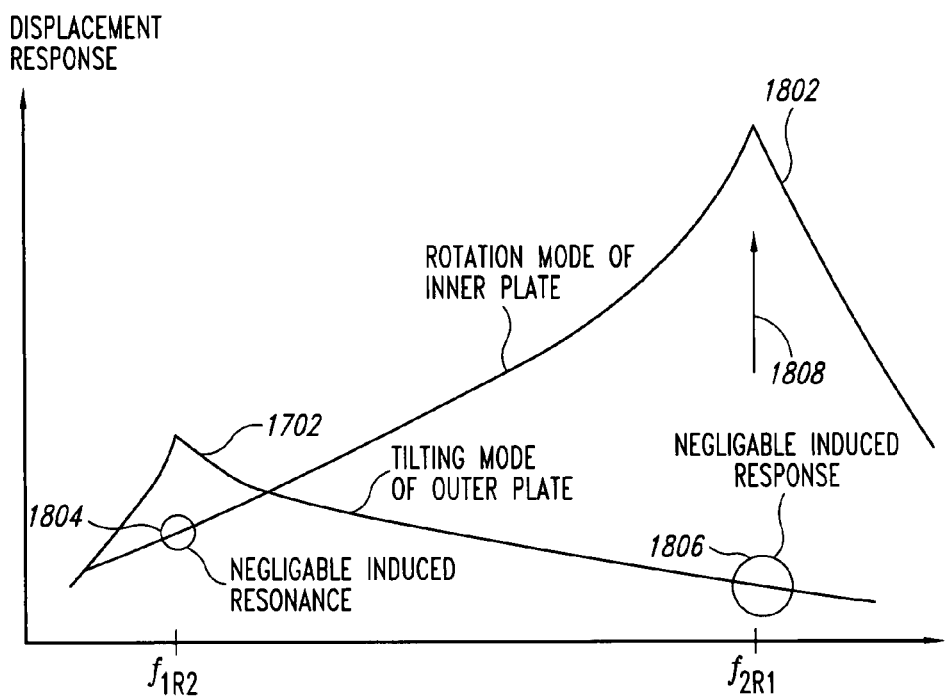
FIG. 18 shows response curves for coupled modes between two resonant bodies. The resonant frequencies are widely separated and there is minimal perturbation of the curve shapes.

Referring now to FIG. 18, there is a relationship between various modes of motion of the various bodies of a MEMS device. Curve 1702 represents the secondary resonant response of a first moving body. In this case the first moving body is a gimbal ring. As indicated in the earlier figures, the secondary response (corresponding to tilting about an axis 116, orthogonal to the gimbal ring support arm axis 110) increases monotonically as one increases frequency to $f_{1R2}$ (i.e. the resonance frequency of the first body in mode 2) corresponding to a single resonance frequency of the system in the second movement response, and then decreases monotonically as the drive frequency is raised further. For one real system the resonance frequency of curve 1702 is equal to approximately 1500 hertz.

Superimposed over curve 1702, which represents tilting of the outer plate, is response curve 1802, representing rotation of an inner plate. For examples of physical embodiments one may refer to inner plate 112 and gimbal ring 106 of FIG. 1 or 4. Thus, curve 1702 represents tilting of the gimbal ring 106 about axis 116, and response curve 1802 represents rotation of inner plate 112 also about axis 116. In the example of FIG. 18, response curve 1802 increases monotonically with frequency until it reaches a resonance frequency $f_{2R1}$ (i.e. the resonant frequency of the second plate in rotation about axis 116). As frequency is increased further the response of the inner plate 112 decreases. For one real system the resonance frequency $f_{2R1}$ of curve 1802 is about 20 kHz.

It is notable that the resonant frequencies of the two response curves shown in FIG. 18 are relatively widely separated, at 1500 hertz and 20 kHz respectively for curves 1702 and 1802. This may be seen from inspection of point 1804 on curve 1802, corresponding to the resonance frequency of curve 1702, and inspection of point 1806 on curve 1702, corresponding to the resonance frequency of curve 1802. In each case the shape of the curve is relatively unaffected by the resonance of the other plate, each curve instead resembling the "pure" responses of FIGS. 16 and 17.

Thus, when the outer plate is driven at $f_{2R1}$ of 20 KHz, it tilts very slightly according to the displacement amplitude of curve 1702 at that frequency, but induces a sizable displacement in the inner plate, which rotates significantly according to the displacement amplitude of curve 1802 at that frequency. This energy transfer is indicated by arrow 1808. This situation corresponds to the cases described earlier, which referred to very slight displacement of one member inducing sizable displacement in another member.

When resonance frequencies of various components of the MEMS system are closer together, other interactions may occur, with each resonance mode affecting the response of the other modes. Before looking at the shapes of curves for such interactions, we refer to FIG. 19, which shows one way to model the mechanical system.

Figure 19:
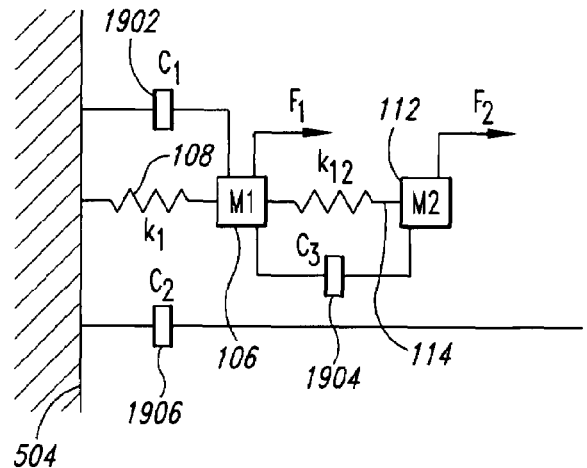
FIG. 19 is a mechanical model for a MEMS device having two oscillatory masses.

In the model of FIG. 19, a base 504, corresponding to a mounting point of the system, is elastically coupled to a first mass M1 106 (corresponding for example to a gimbal ring) through a spring with stiffness $k_1$ and with energy dissipation (non-elastic response) represented by coefficient $c_1$. These are modeled respectively as a spring 108 and a dash pot 1902. A force $F_1$ (not to be confused with lowercase f, used to designate frequency), corresponding to an actuator, may act to displace mass M1 from its rest position. Spring 108 will act to restore mass M1 to its rest position, as modified by the damping action of dash pot 1902.

In this example, spring 108 is numbered to correspond to torsion arms 108a and 108b of FIGS. 1 and 4. Correspondingly mass M1 106 is numbered to correspond to gimbal ring 106 of the same figures. While the primary displacement of mass M1 106 in response to force $F_1$ is, at many frequencies, rotation about axis 110, one may recognize that mass M1 106 may also be displaced in an orthogonal axis of rotation, i.e. in a tilting mode about axis 116. For the present analysis, the main mode of interest is the secondary mode of tilting about axis 116.

Connected to mass M1 106 is a second mass M2 112. Mass M2 may be modeled as being connected to mass M1 via a spring 114 having a spring constant $k_{12}$ and a dash pot 1904 having a damping coefficient $C_3$. Taken in the context of FIGS. 1 and 4, mass M2 112 may be seen to correspond to inner scan plate 112 and spring 114 may be seen to correspond to torsion arms 114a and 114b. Mass M2 112 further interacts with base 504 through dash pot 1906 having a damping coefficient $C_2$. Damping coefficients $C_1$, $C_2$ and $C_3$ correspond to energy dissipation mechanisms of the system. In particular, $C_1$ corresponds to two primary effects: energy dissipation the mounting between the MEMS die 102 and base structure 504, and gas damping acting on the gimbal ring. $C_2$ corresponds primarily to gas damping acting on the inner scan plate 112. $C_3$, which corresponds primarily to energy dissipation in the torsion arms due to the relative motion of M1 and M2, is usually negligible and is therefore ignored when modeling the system.

As with displacement of mass M1 106, mass M2 112 may be displaced by a force F2. Upon such displacement, spring 114 tends to restore mass M2 to its resting position with respect to mass M1 as a function of its spring constant $k_{12}$ as modified by the damping coefficient $C_2$ of dash pot 1906. It can be appreciated that a force F2 acting on mass M2 112 may distend not only spring 114 but also spring 108, depending on the ratio of their respective spring constants $k_{12}$ and $k_1$. Under static conditions, force F1 acts only on spring 108 but not on spring 114. Rather the combined inertia of masses M1 106 and M2 112 tend to oppose force F1 under dynamic conditions. Also under dynamic conditions, it can be appreciated that interactions between the various components of the system may produce complex relationships between the movement of mass M1 and mass M2.

Several simplifying assumptions may be made to ease modeling. These include linear behavior of springs and damping (including no hysteresis), massless springs, linear behavior of the drive forces, and constants that remain constant with various environmental changes including temperature. For some systems, especially systems that undergo large displacements, such simplifying assumptions may not be appropriate, as is known to those having skill in the art. Using the listed simplifying assumptions, dynamic movements of the system represented by FIG. 19 are governed by the differential equations 2102 and 2104 given in FIG. 21.

According to the differential equations shown above, when the system corresponding to FIG. 19 is driven periodically by force F1, motion of both masses M1 106 and M2 112 will result. For example when F2 is set to zero (i.e. F2=0) and F1 is driven in a sine wave (F2=F0*sin(2πf*t)), where F0 is the load amplitude, f is frequency, and t is time, the motion of the two masses may respond as shown by curves 1702 and 1802 of FIG. 20.

As with FIG. 18, curve 1702 represents the tilting mode of the gimbal ring while curve 1802 represents rotation of the inner scan plate. With respect to the model of FIG. 19, curve 1702 also corresponds to displacement of mass M1 106 and curve 1802 corresponds to displacement of mass M2 112 on common displacement axes. In accordance with the structures of FIGS. 1 and 4, the common displacement axis 116 is exhibited as tilting of the gimbal ring in the case of curve 1702 and rotation of the inner scan plate in the case of curve 1802.

Curve 1702 rises monotonically until it reaches the resonant frequency $f_{1R2}$ of the tilting mode of the gimbal ring. It then decreases with further increases in frequency. It does not, however, decrease monotonically as with the system of FIG. 18. Rather, its shape is affected by the response of curve 1802. In other words, the dynamic response of mass M1 106 is affected by the dynamic response of mass M2 112 as dictated by the spring constants, damping coefficients, and masses of the model of FIG. 19. It should be emphasized that the values used in the model correspond to real characteristics of the MEMS device.

Curve 1802 exhibits corresponding interaction with curve 1702. In particular, rather than the curve monotonically increasing until mass M2 reaches its resonant frequency $f_{2R1}$, curve 1802 shows a peak in response 1804 corresponding to the resonant frequency $f_{1R2}$ of the gimbal ring in tilting mode, as represented by curve 1702. In a physical system, the corresponding peaks at $f_{1R2}$ represent in-phase movement of the scan plate 112 and the gimbal ring 106 about axis 116.

As indicated by arrow 2002 the tilting of the gimbal ring transfers energy to the inner scan plate in the form of rotation. Thus, at $f_{1R2}$, an actuator physically coupled to the gimbal ring may be used to drive rotation of the scan plate.

Figure 20:
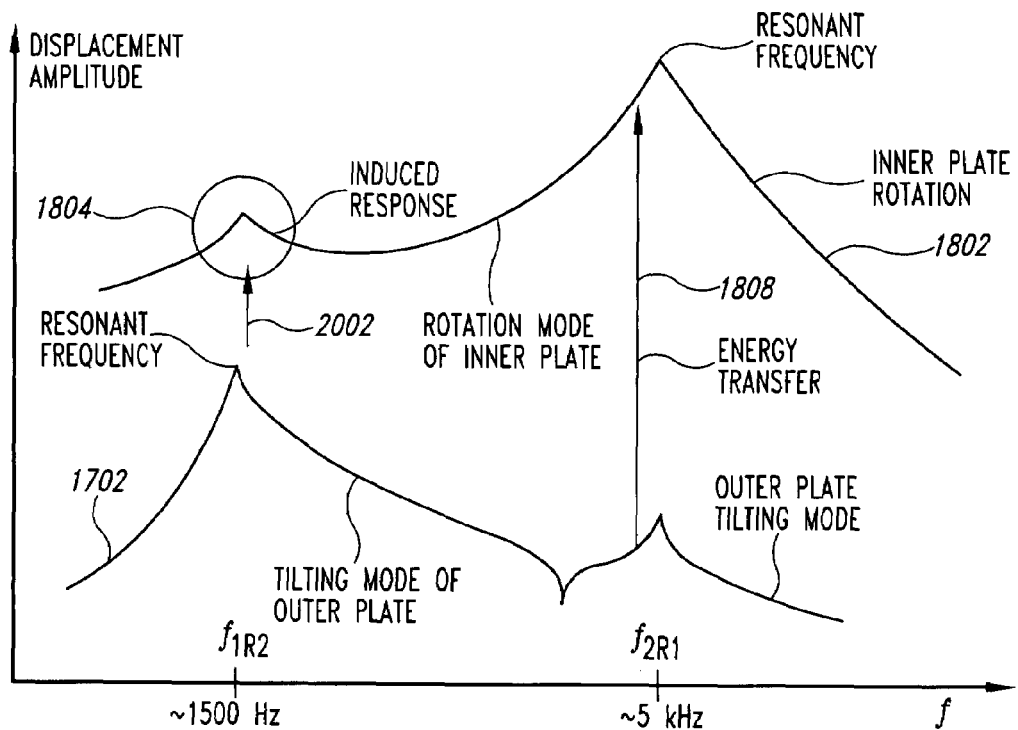
FIG. 20 shows response curves for coupled modes between two resonant bodies. The resonant frequencies are relatively similar and the curves induce perturbations in one another.

As can be seen from FIG. 20, in coupled systems having relatively similar resonant frequencies, the scan plate may be driven at a resonant frequency of the gimbal ring. For this example, the resonant frequency is that of tilting about axis 116. In principal, however, other modes and other resonant frequencies may be similarly used.

At a higher frequency $f_{2R1}$ near the resonant frequency of inner scan plate 112 in rotation, a corresponding phenomenon may be observed as may be seen from inspection of curve 1702 of FIG. 20. At a frequency below but approaching the resonance frequency of the inner scan plate 112 in rotation, a local-minimum is observed in curve 1702. Continuing higher in frequency, the tilting response of the gimbal ring then increases to reach a local maximum near the resonant frequency of rotation of the inner scan plate 112, $f_{2R1}$. At this point, as indicated by arrow 1808, energy is transferred to the inner plate to create a maximum in its displacement amplitude. In the case of present example, this displacement amplitude is exhibited as rotation about axis 116 of the inner scan plate 112 relative to the gimbal ring 106.

Whereas the coupling between curves 1702 and 1804 was in phase at resonance frequency $f_{1R2}$, the coupling at $f_{2R1}$ is out of phase. That is, when scan plate 112 is rotated clockwise by an amount corresponding to the displacement amplitude of curve 1802, the gimbal ring is tilted counterclockwise by an amount corresponding to the displacement amplitude of curve 1702. Thus, while the curves 1702 and 1802 resulted in additive displacement of the mirror surface at frequency $f_{1R2}$, the direction of displacement of curve 1702 at frequency $f_{2R1}$ is in opposition to the direction of displacement of curve 1802.

Figure 21A:
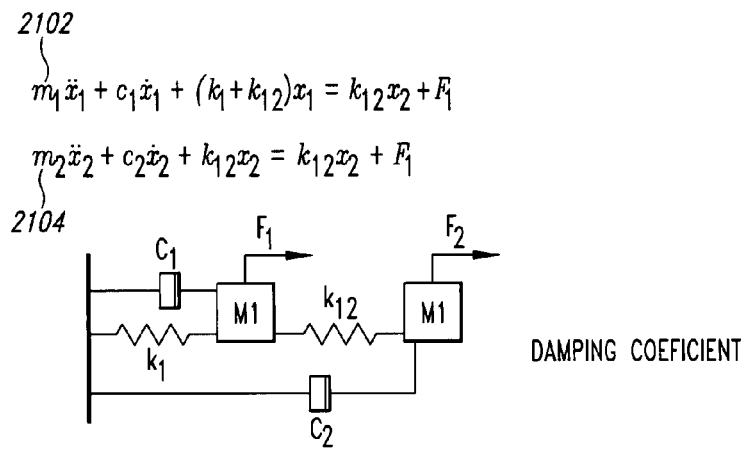
FIG. 21 is a plot of response curves for coupled modes between two resonant bodies of a real MEMS device. The resonant bodies have resonant frequencies that are relatively close together and the bodies induce perturbations in the response of one another.
Figure 21B:
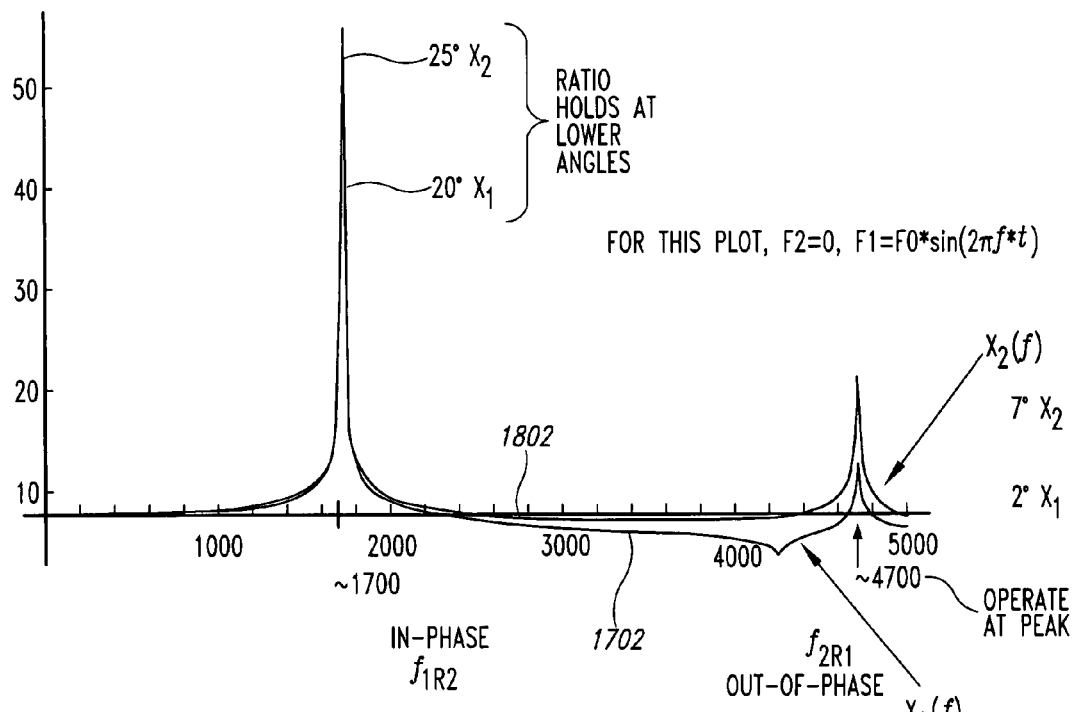

FIG. 21 shows the theoretical frequency response curves on a dB scale of a real system according to the differential equations describing the system of FIG. 19 shown above. The amplitudes are absolute values calculated relative to an external fixed reference frame. At frequency $f_{2R1}$, the scan plate scan amplitude is 7, while the gimbal ring oscillation amplitude is 2. The angles of the two bodies have approximately 180 relative phase at $f_{2R1}$.

While driving the system at a point corresponding to the local minimum of curve 1702 would result in a higher effective ratio of (mirror amplitude response to gimbal ring amplitude response) mechanical amplification factors, the response of the inner scan plate was not sufficient to generate an acceptable scan angle.

Another candidate frequency for driving the system corresponds to $f_{1R2}$, where the responses of the gimbal ring and the inner scan plate are approximately in-phase relative to one another. At this frequency (about 1700 hertz) the system exhibited its highest response of 25° and 20° respectively for curves 1802 and 1702. However, the horizontal scan rate (i.e. about 1700 hertz) was not sufficient to meet other system requirements.

While the examples discussed herein have related to scanning phenomena, and particularly rotation of an inner scan plate suspended by an outer gimbal ring exhibiting tilting, other types of motion may be similarly coupled. Various modes of oscillation as are known to the art may be useful in a variety of applications. For example vertical translation may be used by a variety of systems, including optical focusing applications, range finding applications, or other embodiments were such motion is desired. Similarly, in-plane rotation, plate (vibrational) modes, and in-plane translation may be mechanically coupled to drive a scan plate through resonance. Additionally, similar phenomena may be noted with respect to coupled actuators such as the example of FIG. 1, multiply coupled bodies such as the example of FIG. 5, and with respect to parallel primary oscillatory axes such as the example of FIG. 5 (where induced bodies 106 and 512 both rotate about axis 110).

The preceding overview of the invention, brief description of the drawings, and detailed description describe exemplary embodiments of the present invention in a manner intended to foster ease of understanding by the reader. Other structures, methods, and equivalents may be within the scope of the invention. As such, the scope of the invention described herein shall be limited only by the claims.

What is claimed is:

1. A method for driving a MEMS scanner, comprising:
generating a single drive signal that includes frequency components at first and second frequencies; and
transmitting the single drive signal to a MEMS scanner having resonant responses at the first and second frequencies; wherein the MEMS scanner responds with a first periodic motion at the first frequency and a second periodic motion at the second frequency;
wherein the first frequency is a resonance frequency of the MEMS oscillator in a first axis, wherein the first frequency is not a resonance frequency of the MEMS oscillator in a second axis, wherein the second frequency is a frame rate; and
wherein said generating a single drive signal includes generating a ramp waveform at the second frequency.

2. The method for driving a MEMS scanner of claim 1; wherein the second frequency is a resonance frequency of the MEMS scanner in a second axis.

3. The method for driving a MEMS scanner of claim 1; further comprising receiving a position signal from the MEMS scanner.

4. The method of driving a MEMS scanner of claim 3; further comprising modifying the drive signal to achieve a desired motion in at least one axis.

5. The method of driving a MEMS scanner of claim 1; wherein the MEMS scanner is an electromagnetic beam director.

6. The method of driving a MEMS scanner of claim 1; wherein the MEMS scanner is an electromagnetic beam deflector.

7. The method of driving a MEMS scanner of claim 1; wherein the drive signal includes multiplexed first and second frequencies.

8. The method of driving a MEMS scanner of claim 7; wherein the drive signal is separated into frequency components by a resonant response of the MEMS scanner.

* * * * *